(12) United States Patent
Hirata et al.

(10) Patent No.: US 9,137,175 B2
(45) Date of Patent: Sep. 15, 2015

(54) HIGH PERFORMANCE ETHERNET NETWORKING UTILIZING EXISTING FIBRE CHANNEL FABRIC HBA TECHNOLOGY

(75) Inventors: Kenneth Hiroshi Hirata, Costa Mesa, CA (US); Stuart Bruce Berman, Costa Mesa, CA (US)

(73) Assignee: EMULEX CORPORATION, Costa Mesa, CA (US)

( * ) Notice: Subject to any disclaimer, the term of this patent is extended or adjusted under 35 U.S.C. 154(b) by 0 days.

(21) Appl. No.: 11/960,627

(22) Filed: Dec. 19, 2007

(65) Prior Publication Data

US 2009/0161692 A1     Jun. 25, 2009

(51) Int. Cl.
| | |
|---|---|
| *H04J 3/16* | (2006.01) |
| *H04L 12/931* | (2013.01) |
| *H04L 29/12* | (2006.01) |
| *H04L 12/46* | (2006.01) |

(52) U.S. Cl.
CPC ............ *H04L 49/351* (2013.01); *H04L 12/462* (2013.01); *H04L 29/12801* (2013.01); *H04L 29/12839* (2013.01); *H04L 49/357* (2013.01); *H04L 61/6004* (2013.01); *H04L 61/6022* (2013.01)

(58) Field of Classification Search
CPC ..... H04L 49/351; H04L 49/357; H04L 29/06; H04L 69/165; H04L 69/18; H04L 69/163; H04L 47/27; H04L 47/12; H04L 47/34; H04J 3/16
USPC .......................... 370/466, 474, 395.51–395.54
See application file for complete search history.

(56) References Cited

U.S. PATENT DOCUMENTS

| | | |
|---|---|---|
| 6,400,730 B1 | 6/2002 | Latif et al. |
| 2003/0165160 A1* | 9/2003 | Minami et al. ................ 370/466 |

(Continued)

FOREIGN PATENT DOCUMENTS

| | | |
|---|---|---|
| JP | 2004-503122 A | 1/2004 |
| WO | WO-01/59966 A1 | 8/2001 |
| WO | WO-2009/085536 A2 | 7/2009 |
| WO | WO-2009/085536 A3 | 7/2009 |

OTHER PUBLICATIONS

Tseng et al., IETF RFC 4171—Internet Storage Name Service (iSNS) (Sep. 2005) available at http://www.rfc-editor.org/rfc/pdfrfc/rfc4171.txt.pdf.*

(Continued)

*Primary Examiner* — Jae Y Lee
*Assistant Examiner* — Jean F Voltaire
(74) *Attorney, Agent, or Firm* — McAndrews, Held & Malloy Ltd.

(57) ABSTRACT

This is directed to providing Fiber Channel over Ethernet communication. For example a Fiber Channel over Ethernet (FCoE) enabled device (such as a computer) may include a Fiber Channel over Ethernet Adapter (FCoEA). The FCoEA may include an HBA module. The HBA module may be configured to communicate over the Fiber Channel protocol. The FCoE enabled device may process and encapsulate the HBA module's communication in order to send them over an Ethernet network instead. The FCoE enabled device may process communications directed to various Fiber Channel fabric services by utilizing existing Ethernet services, such as an iSNS server. Thus, the FCoE enabled device can emulate a Fiber Channel network for the HBA module using the Ethernet network and one or more Existing Ethernet services/servers.

43 Claims, 15 Drawing Sheets

(56) References Cited

U.S. PATENT DOCUMENTS

| | | | |
|---|---|---|---|
| 2005/0010688 A1 | 1/2005 | Murakami et al. | |
| 2006/0041580 A1* | 2/2006 | Ozdemir et al. | 707/102 |
| 2006/0041595 A1* | 2/2006 | Taguchi et al. | 707/200 |
| 2006/0047850 A1* | 3/2006 | Singh Bhasin et al. | 709/238 |
| 2006/0251067 A1* | 11/2006 | DeSanti et al. | 370/389 |
| 2008/0056287 A1* | 3/2008 | Kagan et al. | 370/401 |
| 2009/0034522 A1* | 2/2009 | Hayes et al. | 370/389 |
| 2009/0052461 A1* | 2/2009 | Brown et al. | 370/401 |

OTHER PUBLICATIONS

Monia et al., iFCP—A Protocol for Internet Fibre Channel Storage Networking, RFC 4172, Sep. 2005. (http://www.rfc-editor.org/rfc/pdfrfc/rfc4172.txt.pdf).*

Anonymous. (Oct. 2007). "Fibre Channel Over Ethernet: A Unified Fabric in Sight," *Taneja Group Technology Brief*, eight pages.

Carlson, M.A. et al. (Nov. 17, 2000). "A ramework for IP-Based Storage: draft-ietf-ips-framework-00.txt," *The Internet Society*, 40 pages.

Supplementary European Search Report mailed Aug. 13, 2012, for EP Patent Application No. 08868188.7, filed Dec. 2, 2008, 11 pages.

European Patent Office, Communication pursuant to Article 94(3) EPC, in Application No. 08 868 188.7-1862, dated Aprill 6, 2004 (10 pages).

ITOH International Patent Office Office Action dated Feb. 12, 2014 in Japanese Patent Application No. 2012-175957.

\* cited by examiner

HIGH PERFORMANCE ETHERNET NETWORKING UTILIZING EXISTING FIBRE CHANNEL FABRIC HBA TECHNOLOGY

FIELD OF THE INVENTION

This invention generally relates to network devices and more specifically to Fibre Channel over Ethernet controllers and support devices.

BACKGROUND OF THE INVENTION

Fibre Channel is a well known standard for network communications. It is generally used for applications where high data transmission rates and high reliability are necessary, such as storage networks. Fibre channel systems are usually based on one of three topologies—point to point, arbitrated loop and switched fabric. For each topology there exist standard initialization and messaging procedures which various devices connected to the network can use to announce their presence to other devices, determine what other devices are present in the network, and determine when a device enters or exits the network. In the point to point and arbitrated loop topologies, these procedures may be performed by the devices themselves. In the switched fabric topology, these procedures may be at least partially performed by the network fabric—i.e., various switches or servers that are considered to be part of the network itself and not devices communicating with the network.

Ethernet is a network communication standard traditionally used for applications for which the data transmission rate and reliability requirements are not as high as they are for Fibre Channel applications. For example, Ethernet is often used as a base layer for TCP/IP networks, which are in turn used for Internet networking. However, recent developments have brought about Ethernet technology featuring data transmission rates and reliability similar to those of Fibre Channel. An example is the converged enhanced Ethernet (CEE) currently being developed at the IEEE standards body.

Since Ethernet is very prevalent, there have been suggestions to move applications that traditionally rely on Fibre Channel (such as, for example, storage networking) to CEE or other types of Ethernet networks. This would save resources as it would remove the necessity of building and supporting two separate networks in an organization (i.e., a Fibre Channel network for storage and an Ethernet network for Internet access, computer to computer communications, etc).

However, changing existing Fibre Channel applications to Ethernet may require that existing networking devices such as, for example, host bus adapters (HBAs) be completely redesigned to use Ethernet or use other suboptimal protocols such as Internet SCSI (iSCSI). Since existing Fibre Channel HBAs incorporate many years worth of innovation, it may not be cost efficient to completely redesign these devices.

One suggested scheme of switching from Fibre Channel to Ethernet without completely redesigning existing HBAs is to use gateways. More specifically, Fibre Channel over Ethernet (FCoE) gateways can be used to connect a Fibre Channel component to an Ethernet network. An FCoE gateway may be a stand alone device which is connected to the Fibre Channel component through a Fibre Channel link. The gateway may also be connected to an Ethernet network and may thus combine an existing Fibre Channel based HBA with an Ethernet network. However, this approach is not considered optimal as the requirement of using additional standalone devices (i.e., FCoE gateways) would add significant costs and complexity to the resulting networks. Furthermore, this would not completely eliminate the necessity for Fibre Channel infrastructure, because a Fibre Channel connection between the gateway and the HBA would still be necessary.

Therefore, there is a need for creating an end to end CEE (or other Ethernet) high speed network that utilizes the technology of existing Fibre Channel HBAs to a great extent.

SUMMARY OF THE INVENTION

This is directed to providing Fibre Channel over Ethernet communication. For example a Fibre Channel over Ethernet (FCoE) enabled device (such as a computer) may include a Fibre Channel over Ethernet Adapter (FCoEA). The FCoEA may include an HBA module. The HBA module may be configured to communicate over the Fibre Channel protocol. The FCoE enabled device may process and encapsulate the HBA module's communication in order to send them over an Ethernet network instead. The FCoE enabled device may process communications directed to various Fibre Channel fabric services by utilizing existing Ethernet services, such as an iSNS server. Thus, the FCoE enabled device can emulate a Fibre Channel network for the HBA module using the Ethernet network and one or more existing Ethernet services/servers.

DETAILED DESCRIPTION OF EXEMPLARY EMBODIMENTS

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terms of HBA adapters for storage area networks, it should be understood that the present invention is not limited to such circuits, but is generally applicable to any devices that connect through Ethernet (or other similar types of networks), while utilizing circuits that have been originally designed for Fibre Channel (or other similar types of networks).

Figure 1:
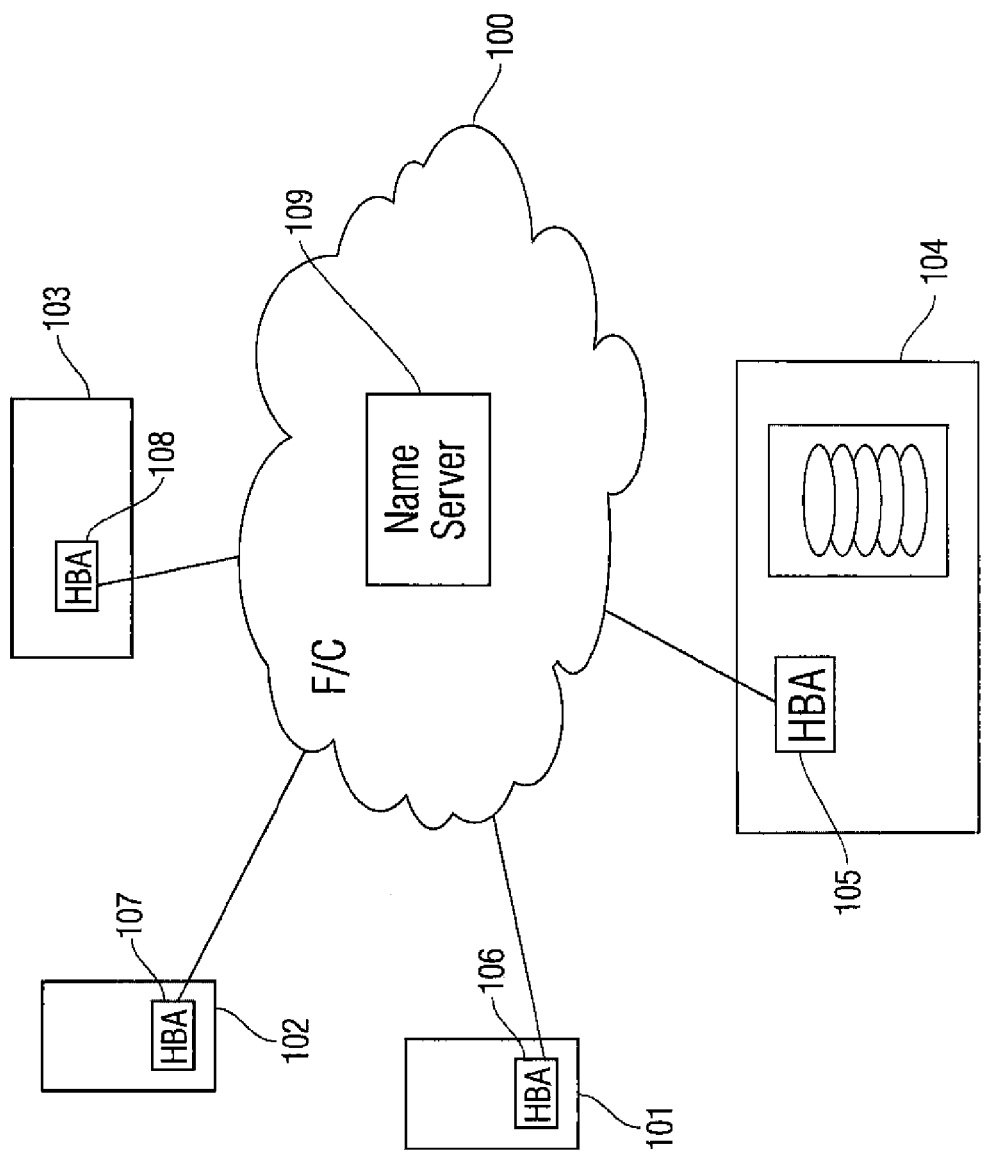
FIG. 1 is a diagram of an exemplary Fibre Channel Fabric network.

FIG. 1 is a diagram of an exemplary Fibre Channel network of the fabric topology. Several devices 101, 102, 103 and 104 can be connected to a Fibre Channel network 100. The exemplary network of FIG. 1 may be a storage area network but other Fibre Channel fabric networks may have similar configurations. Devices 101-103 can be computers and device 104 can be a storage device (such as a RAID array) serving the computers. Fibre Channel Host Bus Adapters (HBAs) 105-108 can be used by the various devices to connect to the network. HBAs are networking devices which are able to perform some lower level network communications processing without burdening a main processor of the device the host bus adapter is a part of. Therefore, host bus adapters are often used with high throughput networks, such as Fibre Channel networks where the potential burden on the main processor if it had to handle the lower level network communications processing would be great.

In order to operate together in a fabric network, devices 101-104 must be aware of at least the other storage device in the network. The devices may obtain Fibre Channel addresses and find the Fibre Channel addresses of other devices through the fabric (i.e., by communicating with various switches and the like within Fibre Channel network 100). Devices may also need to obtain and/or share other, higher level information about each other. For example the devices may need to share the type of each device, (e.g., whether it is a server or a storage device), the number, types and/or names of various elements within a device (e.g. disks), and other information that may depend on a particular application of the Fibre Channel network. For that purpose, each of devices 101-104 may register with a name server 109 and send it various data that describes itself. The name server may keep track of that data. Thus, each device may receive from the name server the various data and attributes describing other devices that are connected to the network.

Furthermore, the various devices may send and receive messages which relate to changes of the network. For example, if a device deactivates, or otherwise drops out of the network, or if a new device enters the network, the fabric may send out messages alerting the connected devices of the status change. These messages are referred to as registered state change notification or RSCN messages, and are provided according to a predefined RSCN protocol.

The name server 109 may be provided as a discrete server, or it can be implemented by one or more switches of the Fibre Channel network 100.

Figure 2:
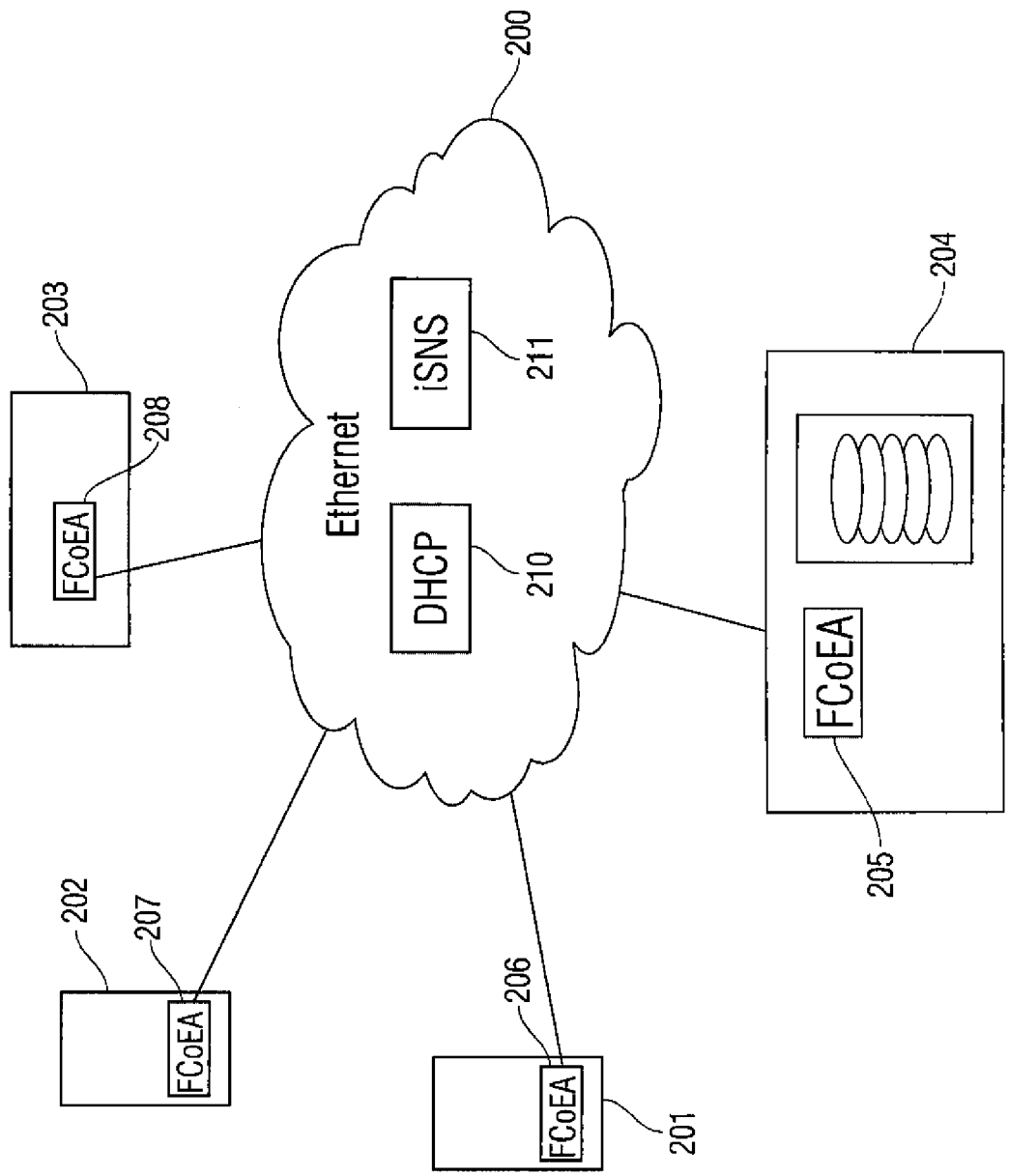
FIG. 2 is a diagram of an exemplary Ethernet network according to embodiments of the invention.

FIG. 2 is a diagram of an Ethernet network. There, devices 201-204 (which may be similar to devices 101-104 of FIG. 1) can be connected to each other through the Ethernet network 200. Ethernet refers to a low level networking infrastructure, and may support other higher level networking protocols, such as, most notably, IP and TCP/IP. Thus, Ethernet network 200 can also serve as an IP and/or TCP/IP network. Furthermore, Ethernet network 200 can be a modern enhanced type of an Ethernet network. For example, Ethernet network 200 can be an Ethernet network enhanced for higher throughput, such as a 10 Gigabit Ethernet network. Furthermore, network 200 can be an Ethernet network enhanced for higher reliability and higher throughput, such as various existing and proposed networks supporting lossless Ethernet enhancements.

As discussed above, it may be desirable to use Ethernet network 200 instead of the Fibre Channel network 100 for the storage area network application. Furthermore, it may be desirable to move other traditionally Fibre Channel based applications to the Ethernet network as well. When more and more applications are moved to a single network, the costs associated with that network will decrease, because of the commonality of components and the ability to share the same network infrastructure among different applications. Thus, for example, Internet access, Storage access, and telephony for an enterprise can all be performed over a single Ethernet network 200.

Devices 201-204 can utilize FCoEAs (Fibre Channel over Ethernet Adapters) 205-208 to connect to Ethernet 200. An FCoEA can provide a lossless Ethernet interface to a Fibre Channel (FC) HBA (Host Bus Adapter). In other words, it can perform the same high throughput networking communication processing functions required of a FC HBA for an Ethernet network (as contrasted from a FC HBA which is usually intended to operate through a Fibre Channel network). FCoEAs may be used to connect devices in an Ethernet based storage area network (SAN) or any other application which has been traditionally based on Fibre Channel networking but is being modified for Ethernet. FCoEAs may be configured to operate with various types of advanced Ethernet networks, such as, for example, CEE (Converged Enhanced Ethernet) lossless networks.

Figure 3A:
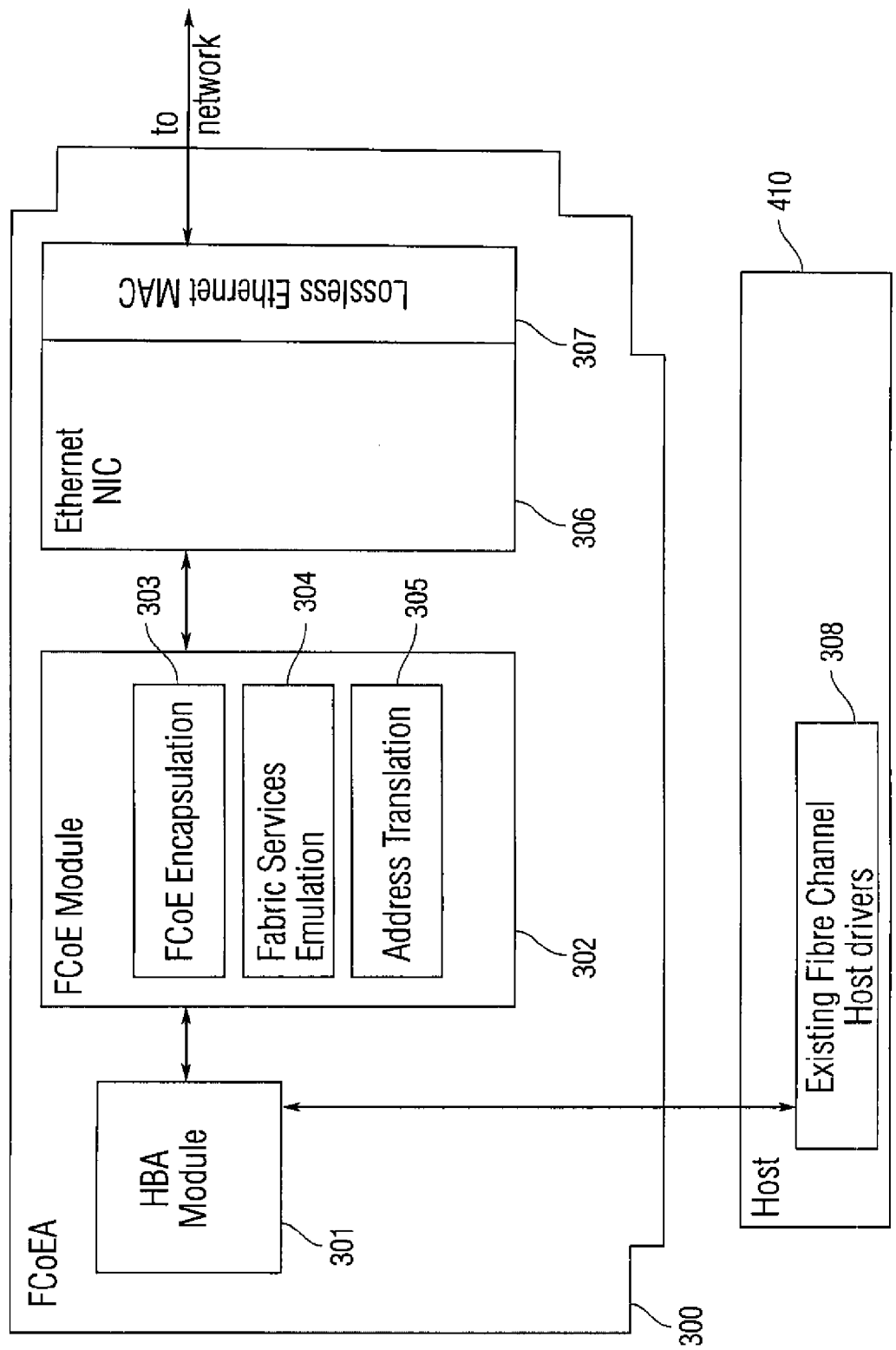
FIG. 3A is a diagram of an exemplary FCoEA (Fibre Channel over Ethernet Adapter) according to embodiments of the invention.

FIG. 3A is a diagram of an FCoEA 300 according to embodiments of the invention. FCoEA 300 may be one of FCoEAs 205-208. FCoEA 300 may include HBA module 301 and FCoE (Ethernet encapsulation of Fibre Channel) module 302. The HBA module can be the same as a respective module of an existing Fibre Channel HBA (such as, e.g., one of HBAs 105-108 of FIG. 1). However, the HBA module may exclude the Fibre channel MAC layer functionality of existing Fibre Channel HBAs, as FCoEA 300 may utilize the Ethernet MAC layer instead and may include the corresponding functionality instead of the Fibre Channel MAC layer functionality.

Thus, the HBA module may have a similar functionality to that of stand alone HBA, such as any one of HBAs 105-108 of FIG. 1. Specifically, the HBA module may be configured to process incoming and outgoing network communications between a server and a Fibre Channel network. However, in the present case, there is no Fibre Channel network connected to the HBA module 301. Instead, that module is ultimately connected to an Ethernet network. Therefore, FCoE module 302 (also referred to as Ethernet encapsulation of Fibre Channel module) can be used to provide a virtual Fibre Channel network to the HBA module while utilizing the Ethernet based network 200. Consequently the HBA module can operate as if it were actually connected to a Fibre Channel network. The goal of this configuration is to utilize existing Fibre Channel based HBA technology in the Ethernet based FCoEAs. Thus, according to some embodiments, by ensuring that significant part of the network processing is performed by existing HBA technology, the development costs of an FCoEA can be reduced.

The FCoE module can perform the above discussed functionalities by utilizing elements 303, 304 and 305. These are discussed in more detail below.

Figure 4:
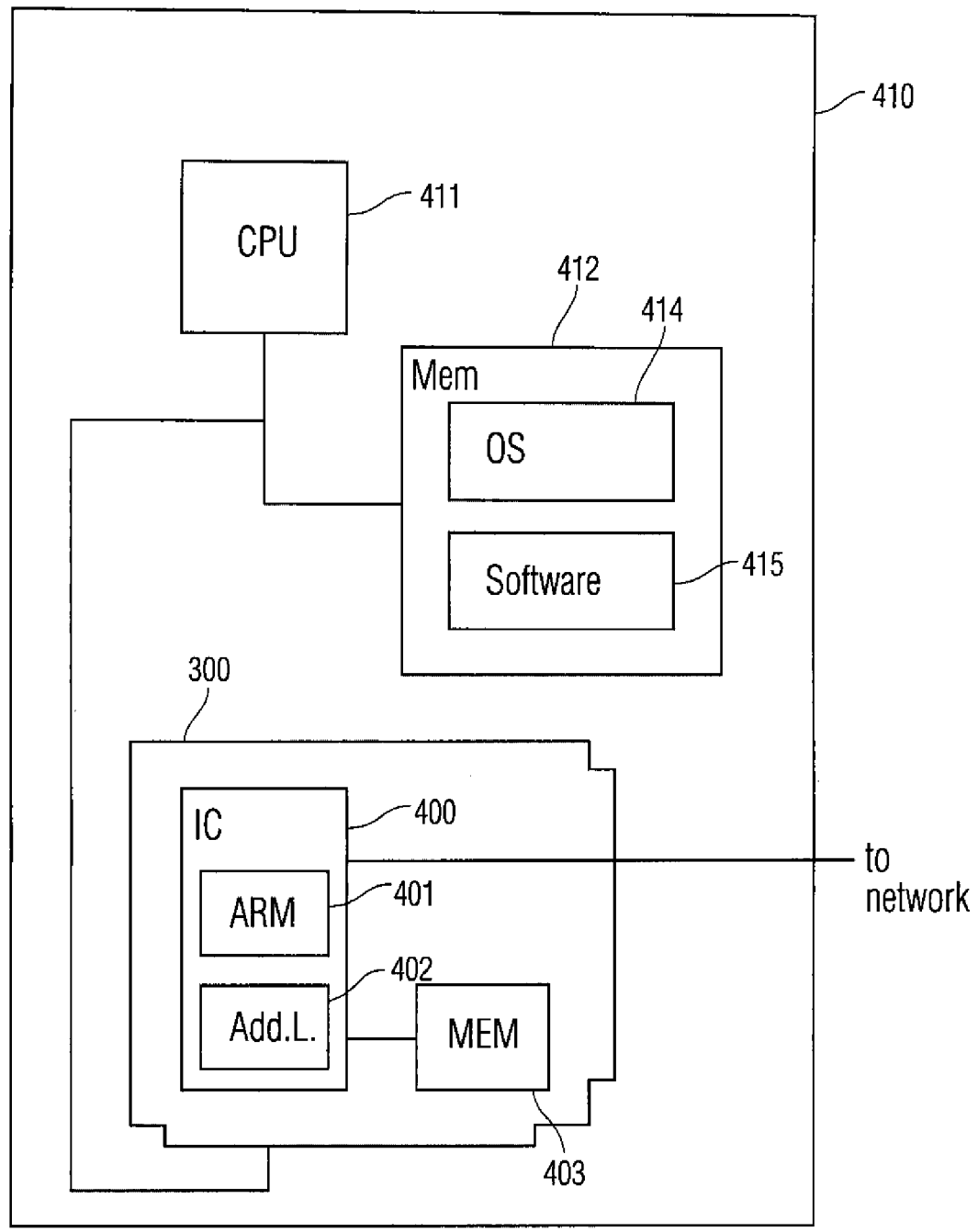
FIG. 4 is a diagram of an exemplary FCoEA enabled device according to embodiments of the invention.

The HBA and FCoE modules can be composed of hardware, software or a combination of both. FIG. 4 is a diagram of an exemplary host computer or computing device 410 (host) that is equipped with an FCoEA 300. The FCoEA 300 may include an integrated circuit (IC) 400 which may include an embedded processor such as the ARM™ processor 401 and additional logic 402. The FCoEA may also include memory 403 which may include instructions executable at the ARM processor, Fibre Channel connection context, statistics, and other types of information. Some of the additional logic and some of the instructions executable at the ARM processor may be part of the HBA module while other portions of the additional logic and other instructions executable at the ARM processor may be part of the FCoE module.

The host 410 may include the FCoEA 300 as well as a CPU (411) and a memory (412). The CPU may execute instructions stored in the memory. Thus, the CPU can execute, for example, an operating system (OS) 414 stored in the memory as well as other software 415 stored therein.

In order to correctly virtualize or map the Fibre Channel network on the Ethernet network, the FCoE module may need to:

(1) Encapsulate outgoing Fibre Channel packets within Ethernet frames for transport over the Ethernet network and extract Fibre Channel packets from incoming Ethernet frames.

(2) Emulate the addressing, naming, messaging and other services of a Fibre Channel network of the fabric topology (e.g., by emulating the existence of a name server and supporting Register State Change Notification (RSCN) messaging, N_Port ID acquisition, inter fabric routing (IFR), virtual Fabrics, etc.)

(3) Add Ethernet specific addresses of destination devices to the Ethernet frames that encapsulate the outgoing Fibre Channel packets.

Referring to FIG. 3A, step (1) can be performed by FCoE encapsulation element 303 of the FCoE module 302, step (2) can be performed by fabric services emulation element 304 and step (3) by address translation element 305. These elements need not be mutually exclusive and can comprise common software and/or hardware. Alternatively, step 2 can be performed anywhere else within the host device including by software stored in the host's main memory and executed at the host's CPU. The examples discussed herein that show this step as being executed in the FCoE module are merely one possible implementation.

A person of skill in the art would recognize that repackaging data in a different format (i.e., executing part 1 above) may be done by "wrapping" Fibre Channel frames into Ethernet frames or, in other words, tunneling or encapsulating Fibre Channel frames over Ethernet. However, part 2 may prove problematic because it requires a Fibre Channel specific name server (such as server 109 of FIG. 1) as well as a Fibre Channel fabric and such elements are not present in Ethernet networks. Designing an Ethernet specific emulator of a Fibre Channel fabric may prove to be a difficult and costly endeavor.

Therefore, embodiments of the present invention utilize two types of servers that already exist for Ethernet networks in order to emulate a Fibre Channel name server. These are a Dynamic Host Configuration Protocol (DHCP) server (210 of FIG. 2) and an Internet Storage Name Service (iSNS) server (211 of FIG. 2).

An iSNS server is an IP (Internet Protocol) network based server which is intended to provide services similar to those of a name server and other Fabric Services in a Fibre Channel network (it should be noted that most Ethernet networks transport IP frames and are also called IP networks). However, the various commands and data formats associated with an iSNS server are different than those for a Fibre Channel name server. Furthermore, there isn't always a one to one correspondence between the commands of an iSNS server and those of a Fibre Channel name server. A DHCP server is a server used for assigning IP addresses to devices in an IP network (such as Ethernet network 200). A DHCP server may be used to provide an IP address of a name server on the network (such as the above discussed iSNS server). It may also be used to assign IP addresses to various devices.

Figure 5:
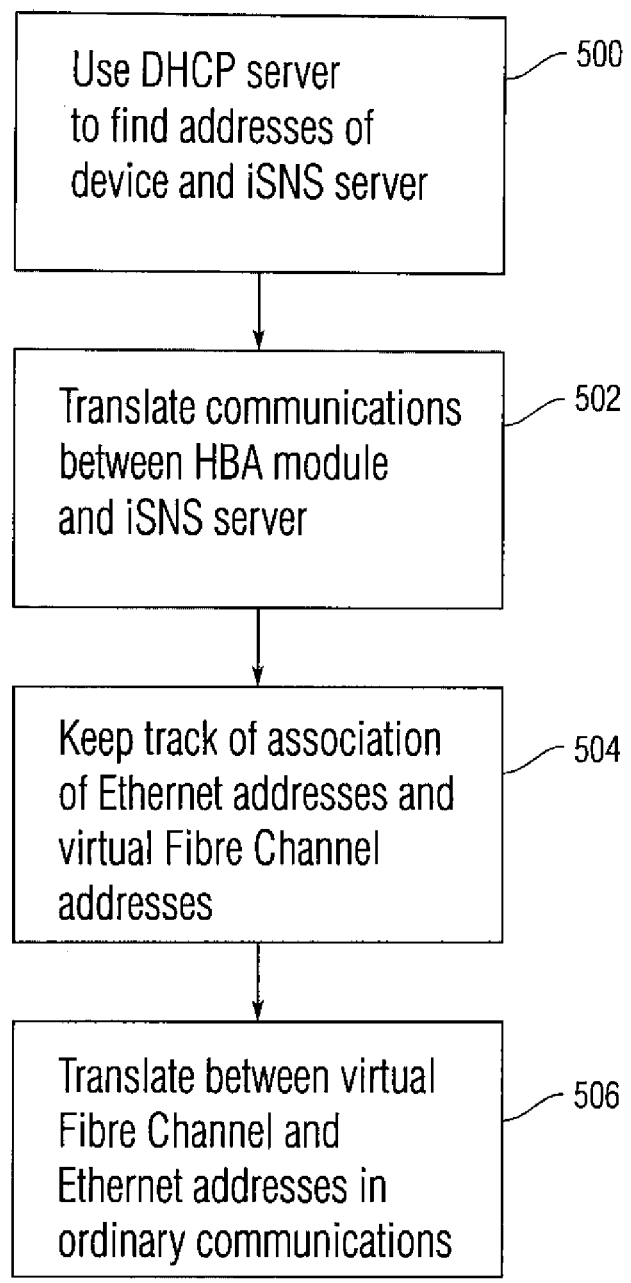
FIG. 5 is a flowchart of an exemplary method of emulating a Fibre Channel network according to embodiments of the present invention.

FIG. 5 is a flowchart of a method of simulating the naming and messaging services of a Fibre Channel network according to embodiments of the present invention. The steps of FIG. 5 can be executed by software or hardware within the FCoEA, as well as by software or hardware at the computer or device which houses the FCoEA. At step 500, the FCoE (Fibre Channel over Ethernet) enabled end device (either the FCoEA or a software driver in the attached FCoEA device) accesses the DHCP server 210 in order to find the address of the iSNS server. At step 502, the FCoE enabled end device translates communications between the HBA module and the iSNS server. As noted above, the FCoE enabled end device emulates a Fibre Channel name server and other Fabric Services. Therefore, it must translate communications in such a manner so that it appears to the HBA that the HBA is communicating with a Fibre Channel name server or other Fabric Service. Since, as noted above, there may not be a one to one relationship between commands and data associated with the iSNS server and those associated with a Fibre Channel name server, step 502 may be performed by a state machine.

Furthermore, as part of step 502, the FCoE enabled end device may need to translate between Ethernet addresses and Fibre Channel addresses. The iSNS server may provide the addresses of various elements on the network (such as devices 201-204) in an Ethernet, IP, or Fibre Channel format. The FCoE enabled end device may need one or more Fibre Channel addresses which can be used by the HBA module. Thus, the FCoE enabled end device may generate Fibre Channel addresses using a seed value provided by the iSNS server and associate them with real Ethernet addresses. Accordingly, in step 504, the FCoE enabled end device keeps track of associations of real Ethernet addresses and Fibre Channel addresses. This may be accomplished by storing pairs of associated Ethernet and Fibre Channel addresses and/or by using predefined formulae for obtaining a Fibre Channel address from an Ethernet address and an Ethernet address from a Fibre Channel address. Furthermore, the iSNS server may also store Fibre Channel addresses of various devices. While the iSNS server is not traditionally intended to provide Fibre Channel addresses, it allows for storage of arbitrary attributes that may be defined by the client. These may be the Fibre Channel addresses.

In step 506, the FCoE enabled end device translates between Fibre Channel and Ethernet addresses in ordinary (i.e., not name server related) communications. Thus, the HBA module may send and/or receive data to and from other devices on the network based on Fibre Channel addresses.

Referring back to FIG. 3A, an Ethernet NIC module 306 may be connected with the FCoE module in order to perform standard lower level Ethernet processing. If an advanced type of Ethernet network is being used (such as, for example, the above noted CEE) the Ethernet NIC may be modified to operate over that network. For example, for a network that features lossless transmission, the Ethernet NIC may include a lossless Ethernet MAC processing element 307, as shown.

The HBA module may be connected to the host 410. Existing Fibre Channel Host drivers 308 may communicate with the HBA module in order to facilitate fibre channel communications for application software running at the HBA module. The host drivers can be executed at the host's CPU.

Some functionality of the FCoEA, especially that of its FCoE module, can be executed by the host CPU and not by the FCoEA itself. For example, the CPU can communicate with the FCoEA in order to execute certain operations associated with emulating a Fibre Channel network and send the results back to the FCoEA. The CPU may perform these FCoEA related operations when executing operating system 414 or other software 415 (e.g., a driver). Furthermore, the CPU can execute the FCoEA related operations as part of executing hypervisor software (not shown).

Figure 3B:
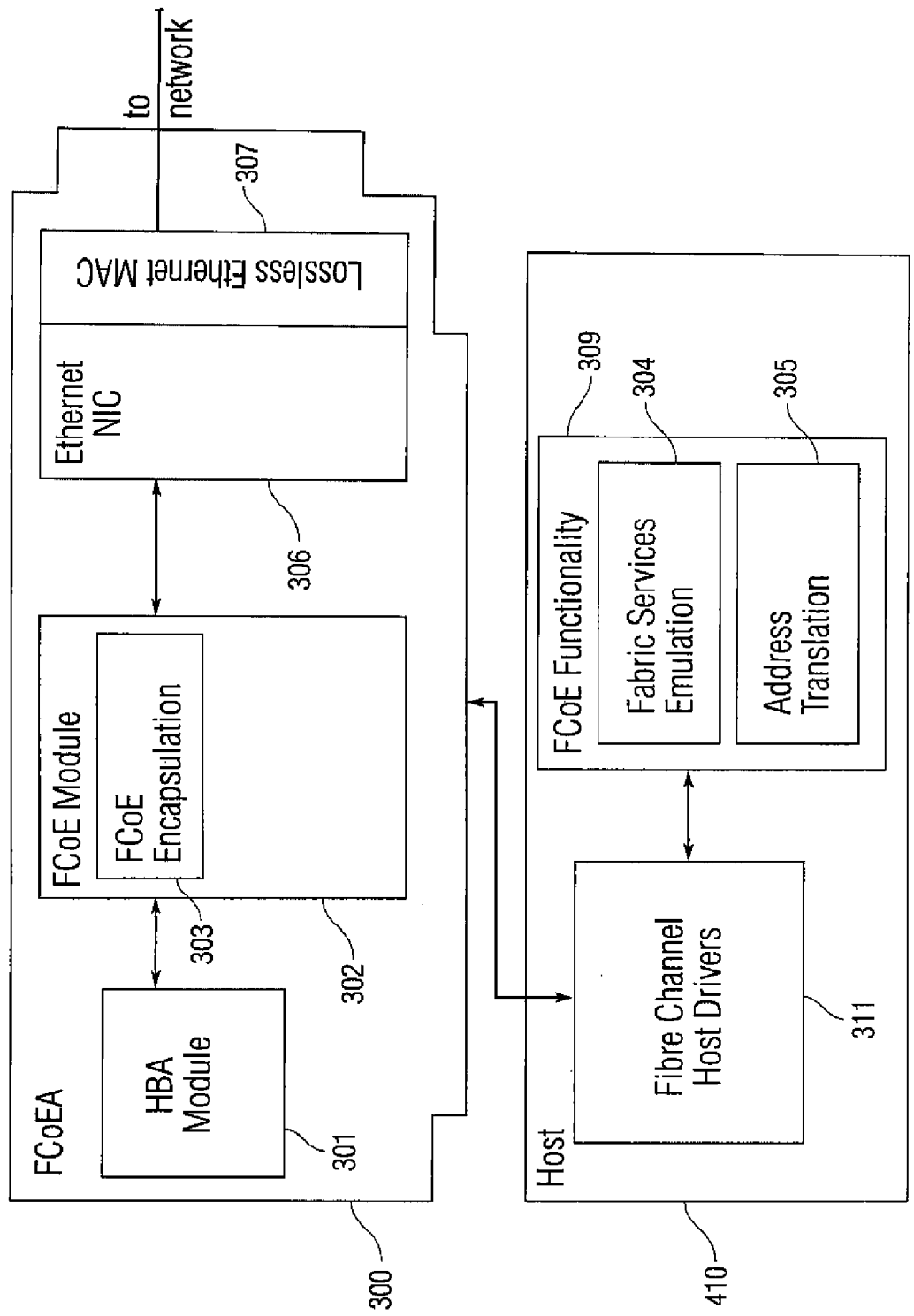
FIG. 3B is a diagram of another exemplary FCoEA according to embodiments of the invention.

Accordingly, FIG. 3B shows another example of an FCoEA that provides for host side execution of the FCoE functionality. FIG. 3B is similar to FIG. 3A, but for the fact that an FCoE functionality element 309 of the host 410 performs some of the functions performed by the FCoE module 302 of FIG. 3A. More specifically, the FCoE functionality 309 of the host performs fabric services emulation and address translation, while the FCoE module still performs FCoE encapsulation. Therefore, the FCoE functionality of the server may include fabric services emulation and address translation elements 304 and 305. The FCoE functionality element can be software running at the host's processor 411. The FCoE functionality may communicate with the FCoEA through Fibre Channel drivers 311. In this case, the Fibre Channel drivers may not be the existing drivers 308, as they may require additional functionality in order to facilitate communications between the FCoE functionality 309 and the FCoEA 300. In some embodiments, the FCoEA functionality may itself be considered as part of a driver for the FCoEA 300.

Figure 3C:
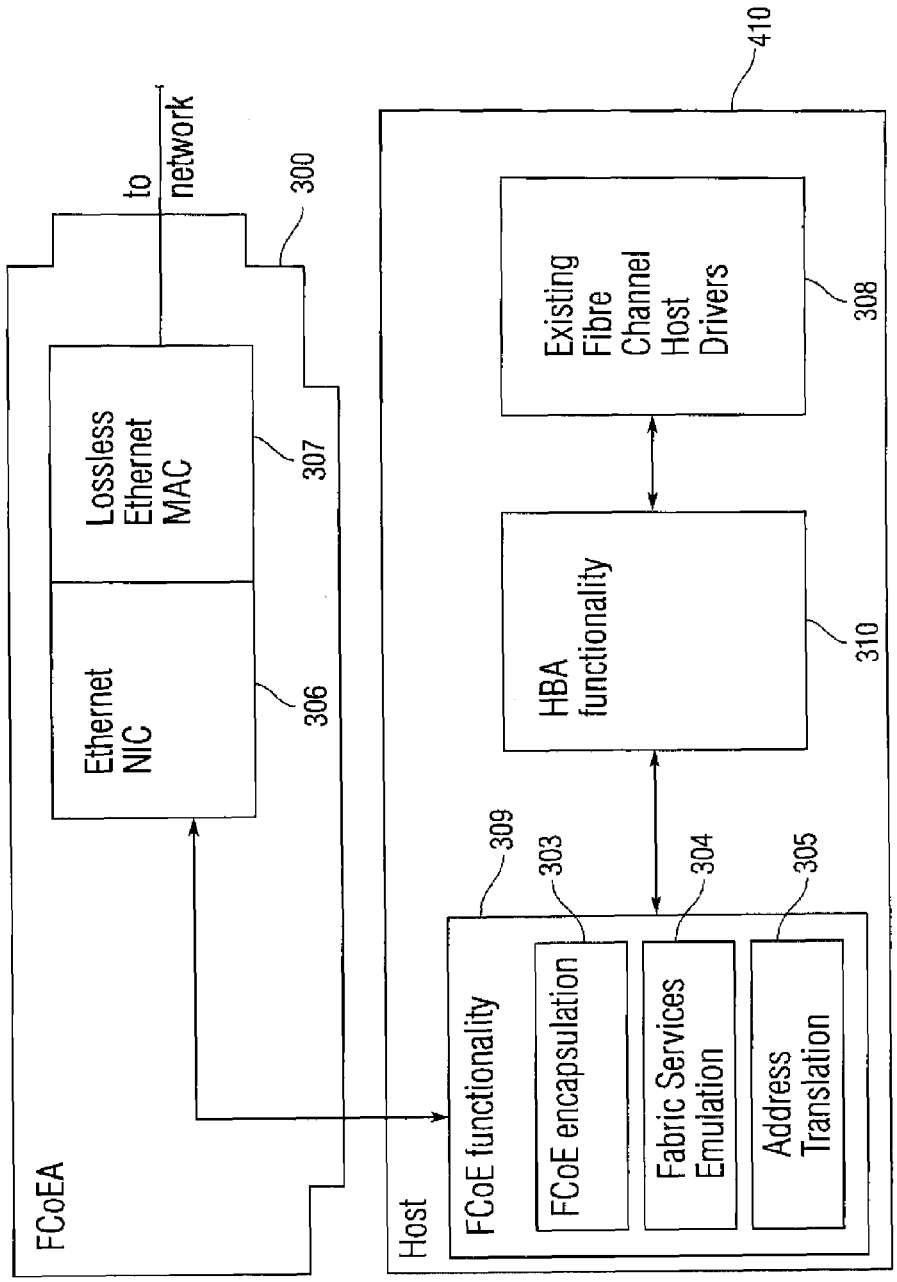
FIG. 3C is a diagram of yet another exemplary FCoEA according to embodiments of the invention.

FIG. 3C shows another exemplary FCoEA in which additional functionality is moved to the host. HBA Module 301 of the FCoEA is replaced by HBA functionality 310. Similarly, the FCoE module is entirely replaced by FCoE functionality 309. The FCoE functionality 309 and the HBA functionality 310 may be implemented through software at the host. The FCoEA retains the Ethernet NIC which includes the lossless Ethernet MAC. Thus, in this embodiment the FCoEA only performs lower layer Ethernet processing, while the host performs all other processing.

The above discussion refers to an FCoE functionality and an FCoE module as well as an HBA functionality and an HBA module in order to note the placement of these elements in the host (FCoE and HBA functionality) or in the FCoEA (FCoEA and HBA modules). However, in general the FCoE and HBA functionalities at the host may also be referred to as FCoE or HBA modules, respectively. When the functionality of a certain element is split between the host and the FCoEA (as is the case in FIG. 3B), then both the host and FCoEA portions together may be referred to as a module. Thus, in FIG. 3B, host based FCoE functionality 309 and adapter based FCoE module 302 may together be referred to as an FCoE module.

Figure 6:
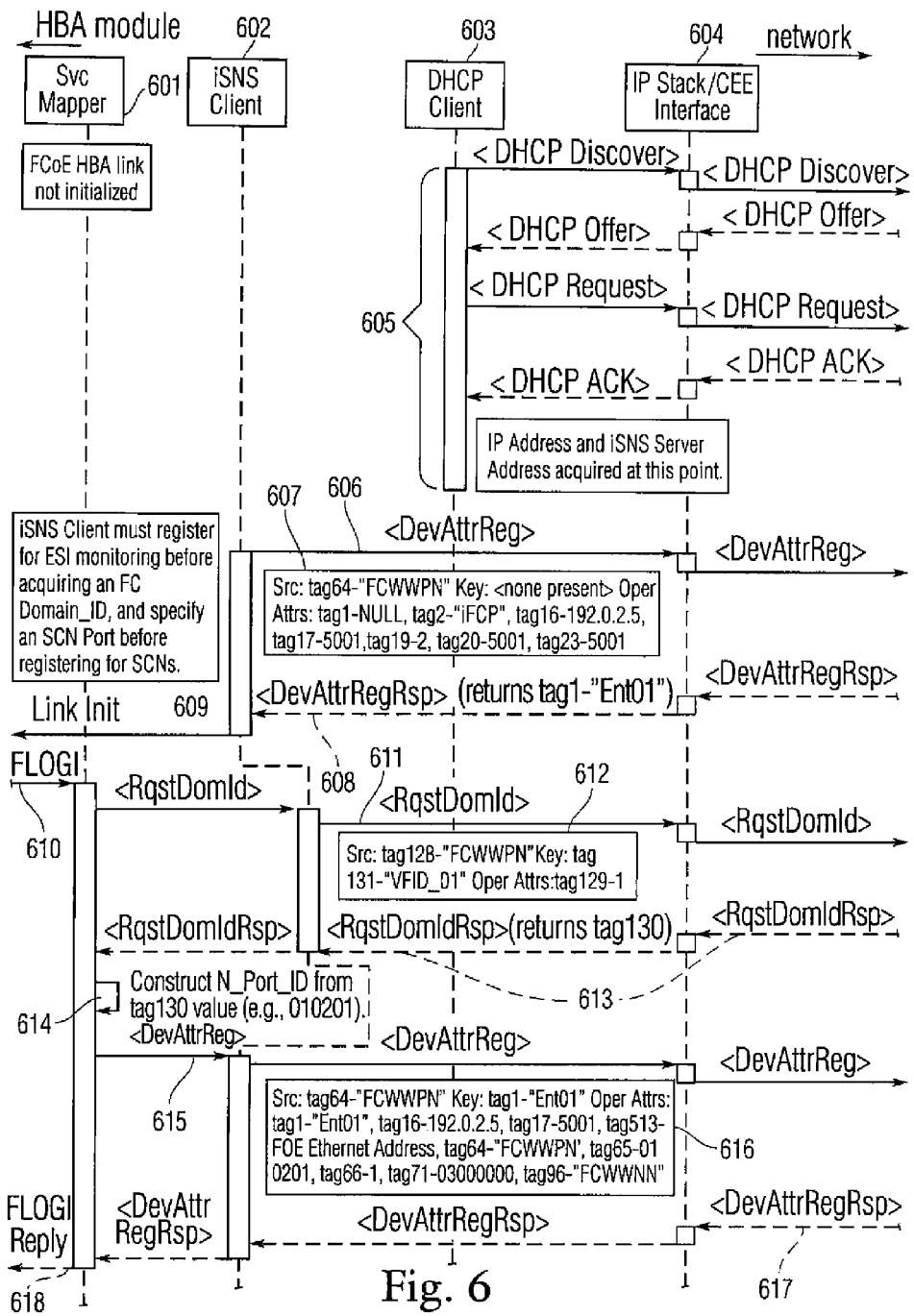
FIG. 6 is a diagram showing the operation of an exemplary FCoE (Ethernet encapsulation of a Fibre Channel frame) module during initialization according to embodiments of the invention.

FIG. 6 is a diagram showing the operation of an exemplary FCoE enabled end device in more detail. More specifically, FIG. 6 shows a sequence or ladder diagram of a FCoE enabled end device during the process of initialization and registration for a name service. The FCoE enabled end device of FIG. 6 may include 4 elements: a service mapper 601, an iSNS client 602, a DHCP client 603 and an IP Stack and/or CEE (Converged Enhanced Ethernet) interface 604. The diagram shows how these elements operate in sequence and over time. The ladder or sequence diagram illustrates elements that are located between the Ethernet Network and the end device high level elements such as the operating system. The network can be an Ethernet network (such as network 200 of FIG. 2). More specifically, the network can be a CEE network. However, the network can encompass other types of IP networks. Time progresses vertically from top to bottom.

The Service Mapper 601 is used to translate communications and data from the Fibre Channel format used by the HBA module to the format used by the iSNS module and back. Commands in angle brackets (such as, for example "<DHCP Discover>") signify commands formatted for the Ethernet network 200, while commands without brackets (such as, for example, FLOGI) signify commands formatted for a Fibre Channel network. The iSNS client is used to communicate with the iSNS server. The DHCP client is used to communicate with the DHCP server. The IP stack 604 is used to format outgoing communications for transmission over the network 200, and to process communications incoming from the network (i.e., remove the network specific formatting from incoming communications). Accordingly, one of the functions of the IP stack/CEE interface can be to split outgoing communications into Ethernet frames and compose incoming communications from incoming Ethernet frames.

Elements 601-604 can be implemented in hardware, software or both. Any or all of the elements 601-604 can also be located on the end device. Combined, these elements are used to emulate an Ethernet network for the HBA module as discussed above.

Initially (or upon startup or network connection) the HBA module is not "connected" to the virtual Fibre Channel network. Accordingly, during an initialization period, the FCoE enabled end device performs Ethernet network related initialization, while the HBA module is led to believe that it is not yet placed in an operating Fibre Channel network. Usually, the FCoE enabled end device needs to perform initialization with respect to the Ethernet network before it is able to simulate the initialization of the Fibre Channel network.

During period 605, the DHCP client 603 of the FCoE enabled end device communicates with the DHCP server through the IP stack 604 in order to: (i) discover the IP address of the current device (i.e., the device the DHCP client is part of) and (ii) discover the IP address of the iSNS server. This may be performed according to known DHCP protocols.

At step 606, the iSNS client registers the current device with the iSNS server by sending a <DevAttrReg> command to the iSNS server. The iSNS client also sends a set of attributes 607 for registration with the iSNS server. The iSNS server returns a <DevAttrRegRsp> message 608 to acknowledge that registration has been performed. Once that acknowledgement is received, the iSNS client sends a Link Init command 609 to the HBA module. The link init command "wakes up" the HBA module. Or, in other words, it indicates to the HBA module that it is connected to a Fibre Channel network. The HBA module is not actually connected to a Fibre Channel network, but at this point the FCoE enabled end device is ready to simulate a virtual Fibre Channel network of the fabric topology for the HBA module.

When initialized, the MBA module attempts to login into a Fibre Channel F_Port Controller by sending an FLOGI command 610. The Service Mapper translates that initial FLOGI command into a <RqstDomId> command. The <RqstDomId> command is an iSNS command which requests an iSNS specific identification (Domain ID) for the current device. This identification may be used as part of one or more Fibre Channel addresses used to identify the current device for all other devices connected to the iSNS server. The iSNS client forwards the <RqstDomId> command to the iSNS server along with attributes 612.

When the iSNS server receives command 611, it assigns a domain ID to the current device and responds by sending a <RqstDomIdRsp> message 613 back. Message 613 includes the assigned domain ID for the current device (as noted in the Figure, the domain ID is attached as tag 130 to the message).

At this point, the current device is registered with the iSNS server and is assigned a domain ID. Thus, the current device may be visible to other devices registered with the iSNS server. However, the domain ID is in an iSNS format and is not a valid Fibre Channel identification. Therefore, the domain ID cannot be directly used to simulate a Fibre Channel network for the HBA module. Therefore, once it receives the <RqstDomIdRsp> message including the domain ID, the Service Mapper 601 creates a Fibre Channel specific ID based on the domain ID (step 614). The Fibre Channel specific ID is referred to as a N_Port_ID. This, ID will be used to identify the HBA module.

The Service Mapper then issues another <DevAttrReg> command (command 615) in order to register the Fibre Channel specific ID with the iSNS server. This is done because there may be other devices in the Ethernet network which also utilize the present invention. In other words there may be other devices which also include an internal HBA module and simulate a Fibre Channel network for that module. These other devices cannot use the Ethernet specific domain ID to represent the current device to their HBA modules. Therefore, the Fibre Channel specific N_Port_ID is registered with the iSNS server so that other devices can access that ID and provide it when necessary to their internal HBA modules. The <DevAttrReg> command 615 may be accompanied by attributes 616.

Once it receives command 615, the iSNS server may register the N_Port_ID of the present device and return as an acknowledgement <DevAttrRegRsp> command 617. Once it receives command 617, the service mapper sends an FLOGI Reply message 618 to the HBA module. Message 618 includes the N_Port_ID. Thus, initialization is complete. The HBA module is under the impression that it has logged into a Fibre Channel Fabric network and received N_Port_ID as identification. In reality, there is no Fibre Channel network and the present device has been registered in the iSNS server in an Ethernet network and is assigned a domain ID as identification.

Thus, after the process of FIG. 6, the FCoEA is registered with the name service of the iSNS server. Thus, the FCoEA is assigned an identification, can be discovered and accessed by other devices on the network and can discover other devices. However, in order for initialization to be complete, the FCoEA usually must also register for a messaging or state change notification service. State change notification services allow various devices to receive alerts of changes of the states of one or more devices on a network. Thus, devices can be kept current without having to continuously request updates from the server. Changes of state may include a disconnect of a device from a network, a connection of a new device or a disconnection and/or connection of a resource in a device (e.g., a connection of a new hard drive in a storage device).

State change notifications are implemented through a registered state change notification (RSCN) service in Fibre Channel and a state change notification service (SCN) in the iSNS protocol. Thus, the FCoE of the present invention may utilize the SCN service in order to emulate the RSCN service of the Fibre Channel protocol.

Figure 7:
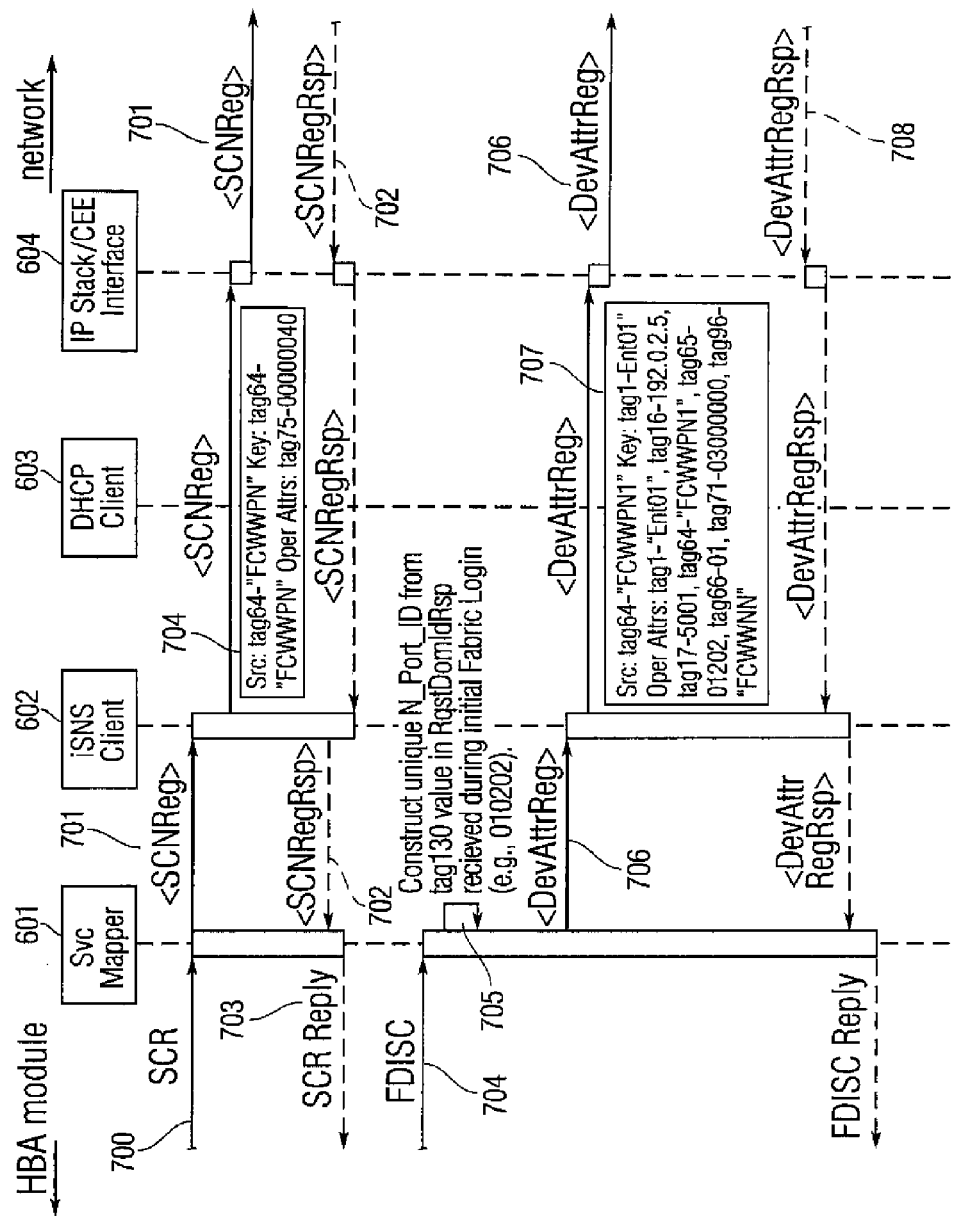
FIG. 7 is a diagram showing the operation of an exemplary FCoE module during State Change Registration and NPIV (N_Port ID Virtualization) initialization according to embodiments of the invention.

FIG. 7 shows registration with a state change notification service according to embodiments of the present invention. Initially the HBA module attempts to register with the Fibre Channel RSCN service by sending a state change registration (SCR) command. The service mapper translates that command into an iSNS specific state change notification registration command (i.e., <SCNReg> command 701). The iSNS client adds attributes 704 to the command. The <SCNReg> command is sent with the attributes to the iSNS server. The iSNS server responds with a <SCNRegRsp> command 702. That command is changed by the Service Mapper to a Fibre Channel specific SCR Reply command 703. The SCR reply command is sent to the HBA module. Thus, registration for state change notification services is complete.

The Fibre Channel protocol supports configurations in which a single port (e.g., a single HBA) can be used to provide connectivity for multiple entities while each of these multiple entities is treated as a different device by the Fibre Channel fabric. Thus, for example, a device which features an HBA may run multiple Operating System instances, and the HBA may allow each operating system to communicate over the Fibre Channel network through the single HBA as if it were a separate device. Thus, the multiple Operating Systems may feature multiple respective N_Port_ID numbers. This feature is referred to as N_Port ID Virtualization or NPIV.

Embodiments of the present invention provide for emulating the NPIV (N_Port ID virtualization) feature over an Ethernet network. An example of this process is shown in FIG. 7. The HBA invokes the NPIV feature by sending an FDISC command 704. The FDISC command is similar to the FLOGI command 610 of FIG. 6, but it request registration of a new Fabric Port ID. Thus, in the context of the previous example, a first OS may use the FLOGI command to obtain a first N_Port_ID, and later OSes may use the FDISC command to obtain their respective N_Port_IDs.

Once it receives the FDISC command, at step 705, the service mapper constructs a second N_Port_ID based on the domain ID provided by the iSNS server during command 613 (also referred to as tag 130). The second N_Port_ID should be different from the initial N_Port_ID constructed in step 614 of FIG. 6.

Once the additional N_Port_ID is constructed, it is registered with the iSNS server by <DevAttrReg> command 706 issued by the Service Mapper. Command 706 includes attributes 707, which indicate that a new port with the new N_Port_ID is being registered. However, a new domain ID is not requested from the iSNS server. Instead all ports are registered under a single iSNS domain ID. The iSNS server returns a <DevAttrRegRsp> message 708. Once that message is received by the service mapper, it sends an FDISC Reply message to the HBA module. The FDISC Reply message can include the second N_Port_ID that was constructed in step 705.

Figure 8:
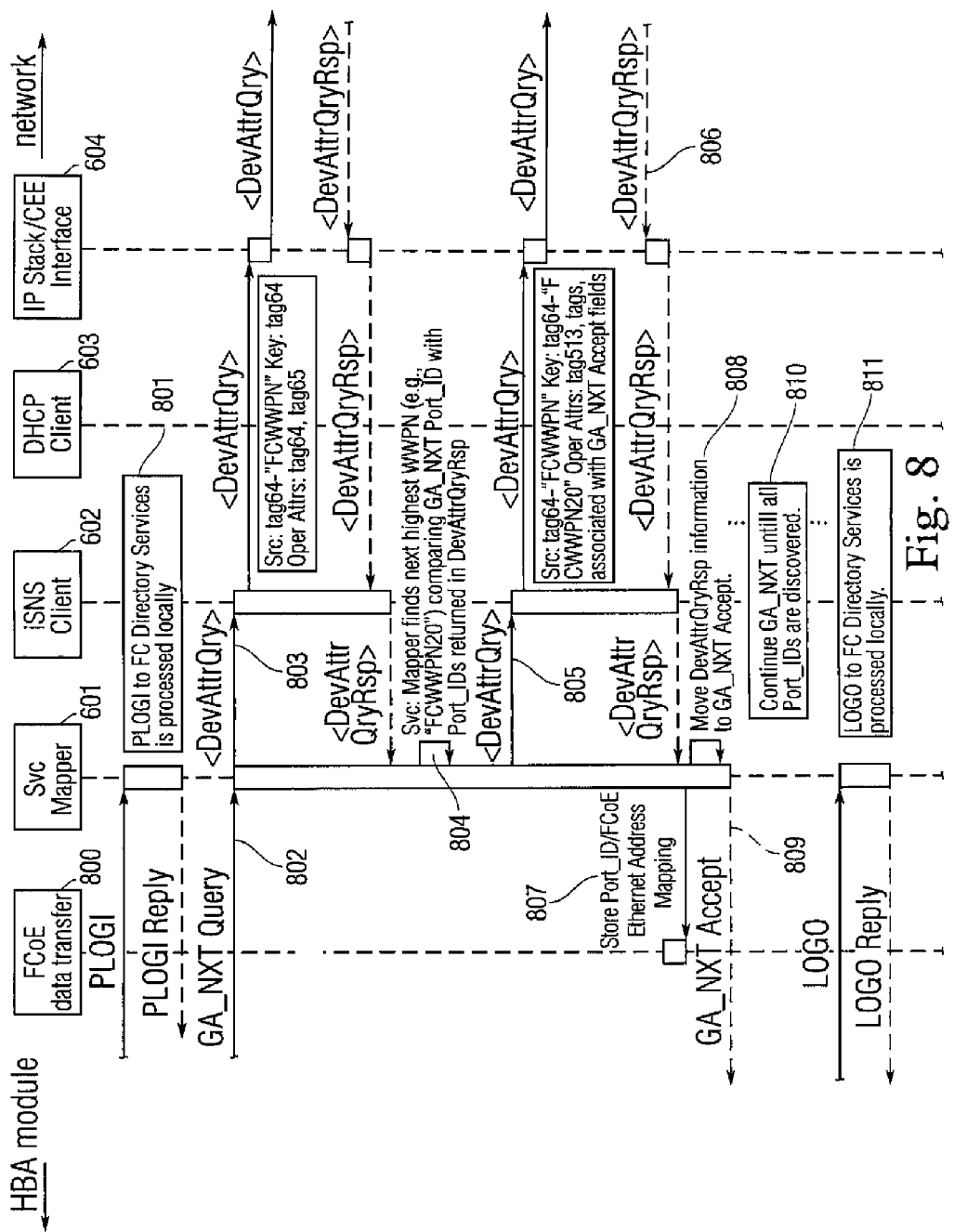
FIG. 8 is a diagram showing the operation of an exemplary FCoE module during device discovery according to embodiments of the invention.

FIG. 8 is a diagram showing the process in which the FCoEA discovers other devices on the network. FIG. 8 also shows an additional FCoE element—the FCoE data transfer element. The FCoE data transfer element is part of the FCoE module and is used to send and receive data to and from other devices on the network. In other words, the data transfer element is not used to communicate with various servers (such as the iSNS and DHCP servers) but to directly communicate with other devices on the network.

In Fibre Channel networks, logging in is required to communicate with the name server. However, the iSNS server of an Ethernet network does not require a login. Therefore, at stage 801, the HBA module attempts to login (by sending a PLOGI). The Service Mapper 601 acknowledges the login by sending a PLOGI Reply message without actually performing a login (as such is not necessary for an iSNS server).

The HBA module may send out a GA_NXT Query 802 in order to discover all other devices on the network. In a Fibre Channel network, a GA_NXT Query causes the name server to sequentially provide information about all devices currently present in the network. The information is returned in an ascending order starting from the N_Port_ID which is next largest from the N_Port_ID included in the command. The GA_NXT Query command does not have an equivalent in an iSNS server. Therefore, the Service Mapper must perform several commands in order to execute it.

The Service Mapper first sends out a query 803, which requests from the iSNS server a list of all active N_Port_IDs. At step 804, the Service mapper determines the next largest N_Port_ID. With command 805, the Service Mapper requests from the iSNS server additional information for the next N_Port_ID. The additional information may include all fields that are usually provided with the response to a GA_NXT Query, as well as the Ethernet address of the device whose N_Port_ID is being queried. This data is received with a response from the iSNS server 806.

At step 807, the combination of the N_Port_ID and Ethernet addresses of the queried device is stored by the FCoE data transfer element 800. This is necessary, because when HBA module attempts to communicate with the queried device, it will address the communications to the N_Port_ID of the queried device. The N_Port_ID, however is a Fibre Channel specific address. This address will need to be converted to an Ethernet specific one in order for the communications to be sent over the Ethernet network. Therefore, the FCoE data transfer module stores each N_Port_ID and its respective Ethernet address that are received from various queries to the iSNS server. The FCoE data transfer module may then use this stored information to translate the destination N_Port_ID communications sent by the HBA module to a respective Ethernet address.

At step 808, the service mapper translates the information received from the iSNS server into a format associated with a Fibre Channel GA_NXT Accept message. The Service Mapper then sends that data to the HBA module in a GA_NXT Accept message. At step 810, the HBA module repeats step 802 causing the service mapper to repeat steps 803-809. The HBA module repeats step 802 until all N_Port_IDs are discovered. Thus, all N_Port_IDs can be scanned and information about them sent to the HBA module. It should be noted that the HBA module does not receive the Ethernet addresses of the Port IDs, since it is not aware of the existence of the Ethernet network. These addresses are instead received and used by the FCoE data transfer module 800, as discussed above. At step 811, the HBA module logs out, said log out being processed locally by the service mapper.

Figure 9:
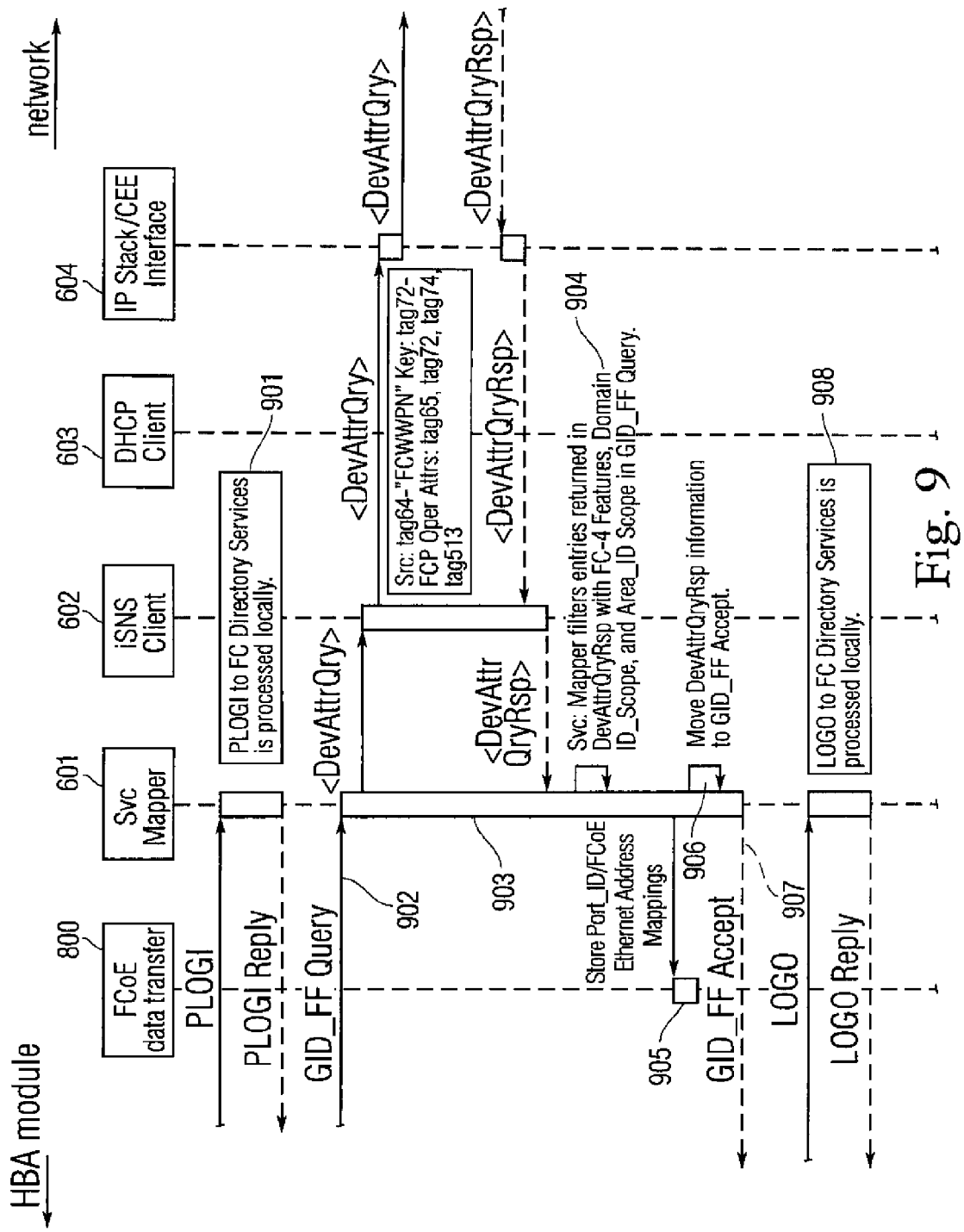
FIG. 9 is a diagram showing the operation of an exemplary FCoE module during device discovery according to embodiments of the invention.

FIG. 9 shows the operation of the FCoE module during a GID_FF Query. A GID_FF Query is a query that requests the N_Port_IDs of all devices that have particular features. For example, that query can be used to obtain all targets. This process is similar to the one discussed above with respect to the GA_NXT Query.

At step 901, the HBA module performs a login that is handled locally by the Service Mapper. The HBA module then issues a GID_FF Query (step 902). The service mapper sends a query to the iSNS server requesting information on all devices registered with the ISNS server (step 903). The service mapper then filters the received entries based on the parameters of the GID_FF Query (step 904). The FCoE data transfer element stores Port ID and Ethernet address mappings of the filtered ports (step 905). The service mapper reformats the data associated with the filtered ports in a Fibre Channel format (step 906) and sends that data to the HBA module (step 907). Having received a response to its command, the HBA module logs out and the logout is processed locally by the service mapper (step 908).

Figure 10:
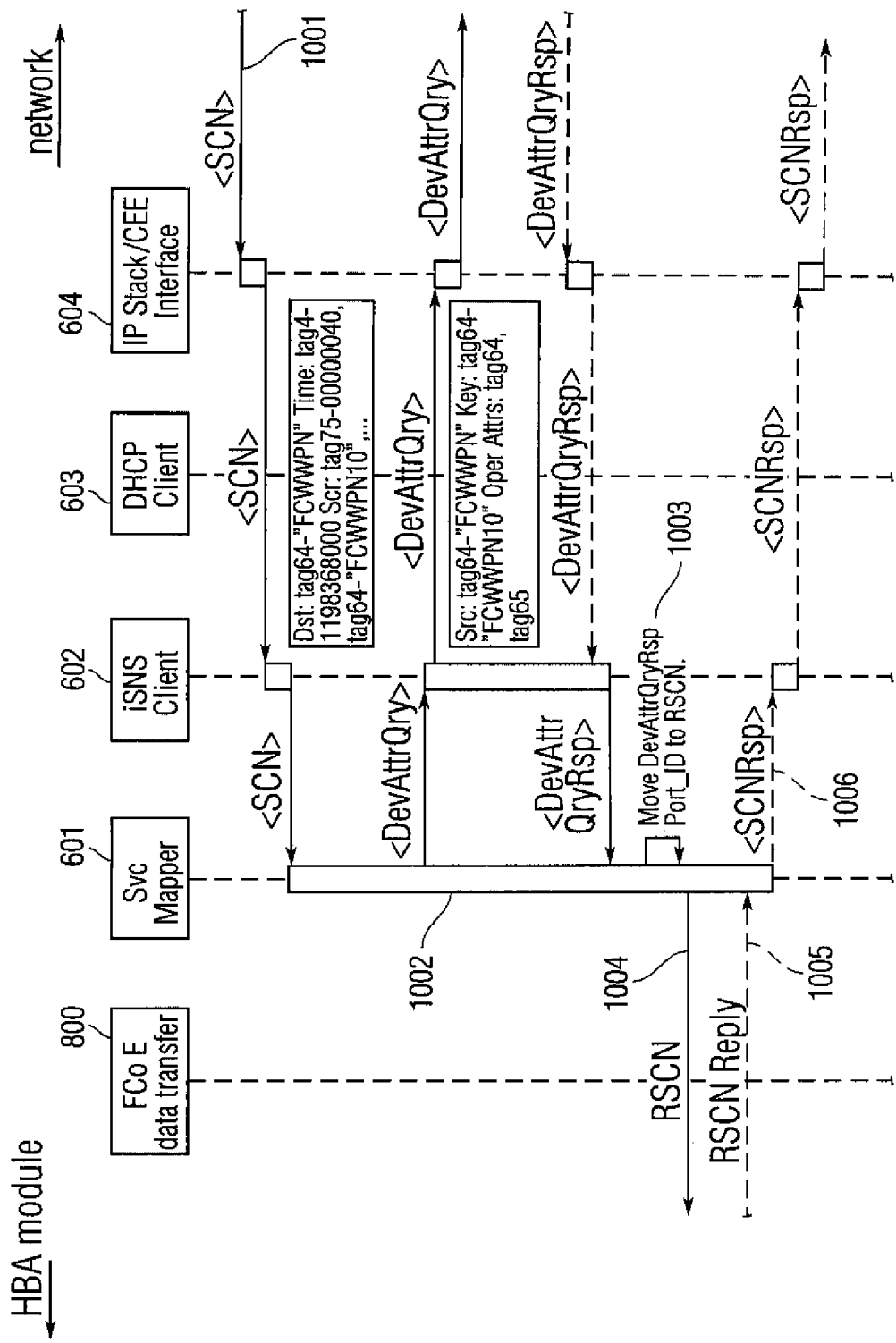
FIG. 10 is a diagram showing the operation of an exemplary FCoE module during receipt of a state change notification message according to embodiments of the invention.

FIG. 10 is a diagram showing the behavior of the FCoE module during receipt of a state change notification message. As noted above state change notification messages may be used by a server (such as a Fibre Channel name server or an iSNS server) to inform the device of changes in the network, such as a drop out of one of the devices from the network, an addition of a new device, etc.

The iSNS server sends out a state change notification (<SCN>) message 1001. Message 1001 may, for example, inform that a certain device has dropped out of the network. Naturally, the <SCN> message is in an iSNS format and therefore does not include the Fibre Channel N_Port_ID of the dropped out device. Instead it only includes an iSNS specific address (i.e., the World Wide Port Name, tag 64). Therefore, at step 1002, the service mapper requests and receives the N_Port_ID of the affected device from the iSNS server. In step 1003, the service mapper forms an RSCN message (i.e., a Fibre Channel formatted state change notification message) utilizing data received from the <SCN> message 1001 and the N_Port_ID received in step 1002. The service mapper then sends the thus formed RSCN message 1004 to the HBA module. The HBA module then provides an RSCN reply. The service module reformats that reply to an iSNS formatted response message (<SCNRsp> message 1006). The <SCNRsp> message is then sent back to the iSNS server.

As noted above data transfer may be performed by the FCoE data transfer element 800. The data transfer element may store pairs of Ethernet addresses and N_Port_IDs of other devices in the network in a table, whenever this data is obtained from the iSNS server. See, for example, steps 807 of FIGS. 8 and 905 of FIG. 9. When the data transfer element receives a Fibre Channel packet destined to a particular Fibre Channel N_Port_ID, it can consult the afore-mentioned table in order to obtain an Ethernet address associated with that N_Port_ID. The data transfer module may then place the Fibre Channel packet into one or more Ethernet frames and address the Ethernet frames to the Ethernet address obtained from the table.

In theory, all N_Port_IDs to which the HBA module addresses communications should be stored in the table (along with their respective Ethernet addresses). This should be the case, because in order for the HBA module to be aware of an N_Port_ID, it must obtain it through the FCoE module from the iSNS server. See for example, the processes discussed in FIGS. 8 and 9. When the HBA module obtains an N_Port_ID in this manner, the FCoE data transfer element should store the N_Port_ID and its respective Ethernet address in its table (see, e.g., steps 807 of FIGS. 8 and 905 of FIG. 9).

However, there exists a possibility that an HBA module may attempt to access an N_Port_ID that is not in the FCoE data transfer element's table. This may be the case if the HBA module becomes aware of the N_Port_ID in another manner, or simply decides to "blindly" send a message to a specific N_Port_ID. Embodiments of the present invention may account for this possibility by providing the method shown in FIG. 11.

Figure 11:
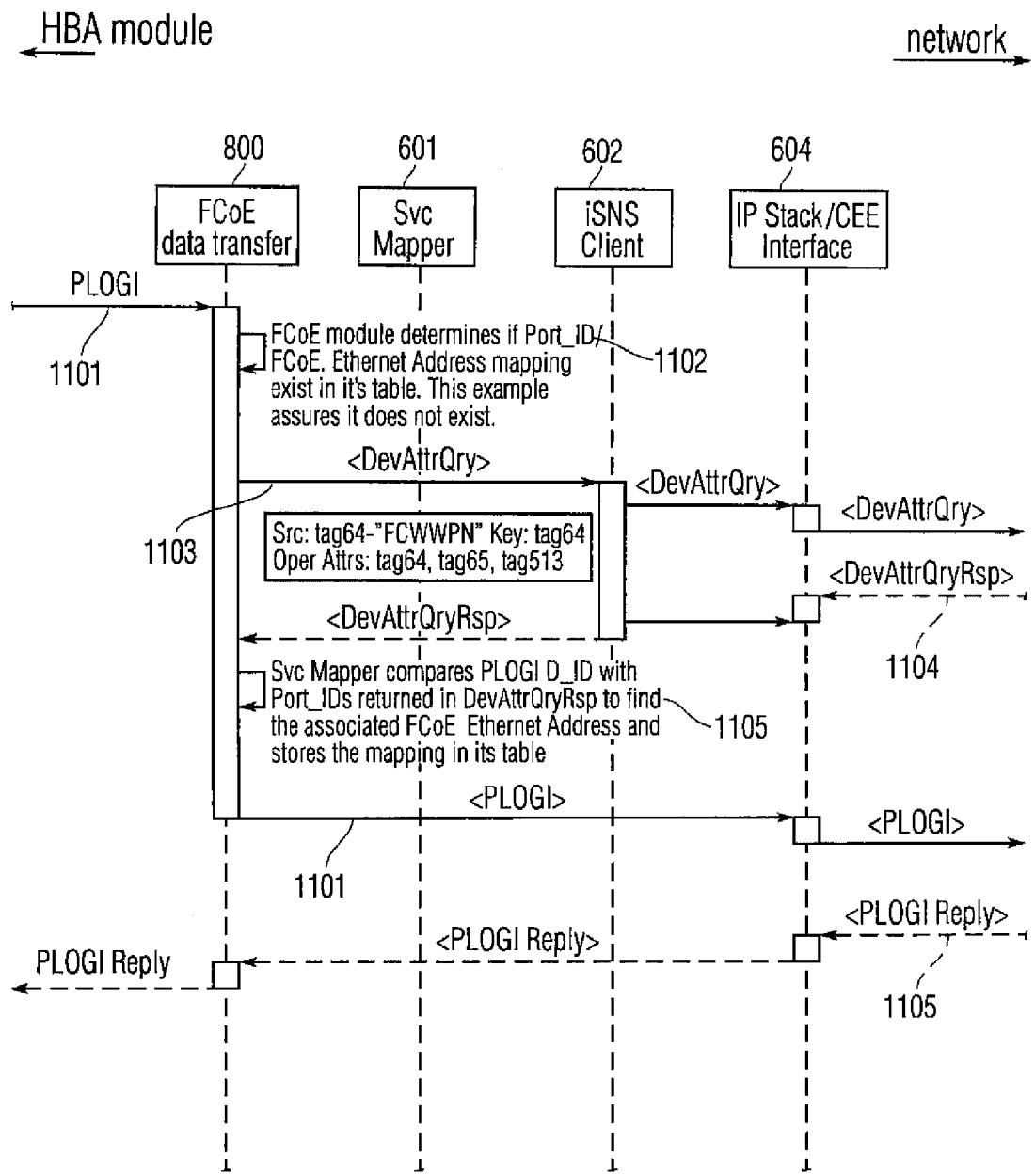
FIG. 11 is a diagram showing the operation of an exemplary FCoE module during Port Login according to embodiments of the invention.

Initially, the HBA module may attempt to log in to another device by sending a log in command (PLOGI command 1101). The PLOGI command 1101 is addressed to another device and not to the name server of the virtual Fibre Channel network. At step 1102, the FCoE data transfer element determines whether a Fibre Channel destination address (i.e., an N_Port ID) of the PLOGI command is in its table. As noted, the process of FIG. 11 is executed when the N_Port_ID is not in the FCoE data transfer element's table.

Upon determination that the N_Port. ID address is not in its table, the data transfer element sends a query (<DevAttrQry> 1103) to the iSNS server requesting data on all devices registered with the iSNS server. The iSNS server provides the data for all devices in its response 1104. At step 1105, the FCoE data transfer element searches through the received data to locate a record of a device with an N_Port_ID identical to the one provided in the PLOGI command 1101. Once it discovers that device it saves the N_Port_ID number and its associated Ethernet address in its table.

It then sends the PLOGI command 1101 to the Ethernet address obtained in step 1105. The remote recipient of command 1101 may send reply 1105. Once received, the reply is reformatted and forwarded to the HBA module. Thus, the current HBA module is logged into a remote HBA module and may proceed communicating with it. Since the FCoE data transfer module now has the Ethernet address of the remote MBA module, it can easily process and route these communications.

While the examples above have been provided in the context of a single Ethernet network, embodiments of the present invention may be used to connect devices that are part of multiple networks. A person of skill in the art would recognize that the above described embodiments of the present invention can be used with multiple connected Ethernet networks. Furthermore, embodiments of the present invention can be used with heterogeneous network environments in which multiple networks of different types are connected.

Figure 12A:
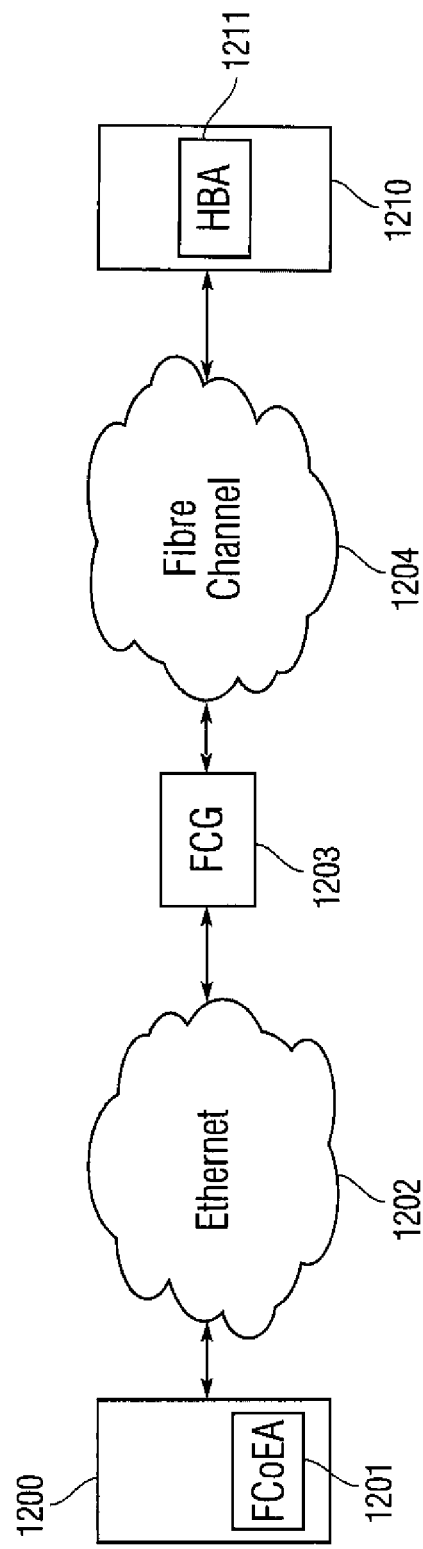
FIGS. 12A and 12B are diagrams of showing embodiments of the present invention being utilized in multiple heterogeneous networks.

FIG. 12A shows an example of one such environment. More specifically, FIG. 12A shows an FCoE enabled device 1200 that includes an FCoEA that is connected to Ethernet network 1202. The Ethernet network is connected to a Fibre Channel Gateway 1203. The Fibre Channel gateway is a gateway used to interconnect an Ethernet and a Fibre Channel network. The Fibre Channel gateway is connected to a Fibre Channel network 1204 which is in turn connected to another end device 1210 which utilizes a standard Fibre Channel HBA 1211.

The Fibre Channel gateway may connect the two networks using techniques similar to those discussed above. Thus, the Fibre Channel gateway may encapsulate and de-encapsulate communications passing between the two networks.

Furthermore, the Fibre Channel gateway may forward addressing and name server communications between the two networks in order to allow FCoEA 1201 and HBA 1211 to discover each other's addresses and other information. The Fibre Channel gateway may achieve this, for example, by logging into the fabric and name server of network 1204 in order to discover information about device 1210 and into the iSNS server of Ethernet network 1202 in order to discover information about device 1200. The Fibre Channel gateway can then provide the information of device 1210 to the iSNS server of network 1202 and the information of device 1200 to the fabric and name server of network 1204. However, in both cases the gateway may provide its own address instead of that of the other device. Thus, when the two devices communicate with each other, they can send communications to the gateway which can forward them to the other device in the other network. The gateway can also operate in cases where there are multiple devices in one or both networks (in that case it may need to use multiple addresses).

Figure 12B:
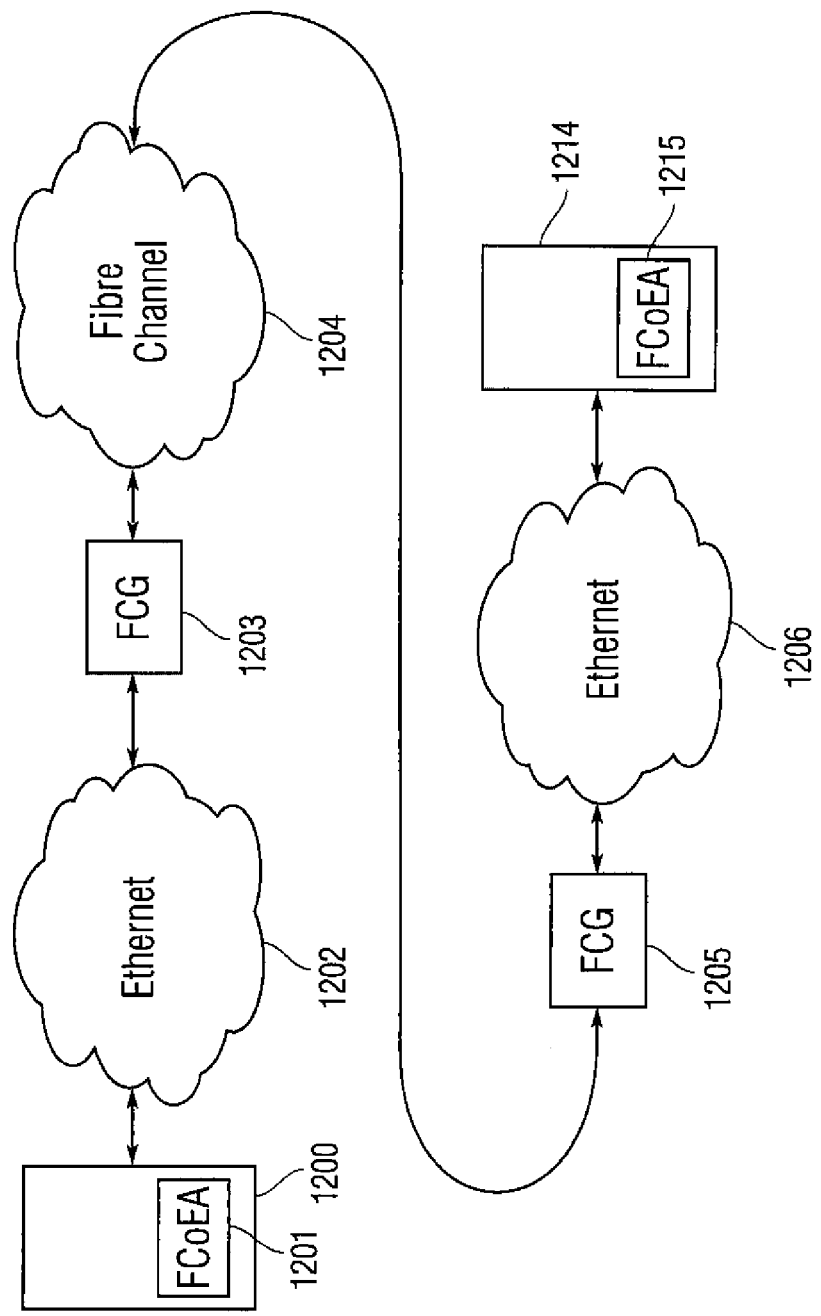

FIG. 12B illustrates another example of multiple heterogeneous networks. In this case, device 1200 may use FCoEA 1201 to connect to Ethernet network 1202, which connects to a Fibre Channel gateway 1203 and an Ethernet network 1204. Ethernet network 1204 may in turn connect to a second Fibre Channel gateway 1205 which may connect to a second Ethernet network 1206. A second device 1214 including an FCoEA 1215 may be connected to the second Ethernet network. Thus, two devices can be connected through two Ethernet networks that include a Fibre Channel network between them. While only two devices are shown, multiple devices may be connected to each network.

It is noted that the present invention is not limited to the specific exemplary embodiments discussed above. For example, the FCoE module is not limited to the elements discussed in FIGS. 6-11, or to the methods discussed in these figures.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method comprising:
requesting one or more Ethernet addresses from an Internet Storage Name Service (iSNS) server;
receiving a seed value from the iSNS server;
generating one or more Fibre Channel addresses using the seed value provided by the iSNS server;
saving the one or more Fibre Channel addresses and the one or more Ethernet addresses in a table;
sending a Fibre Channel address, from the one or more Fibre Channel addresses in the table, to a Host Bus Adapter (HBA) module;
generating Fibre Channel communications by the HBA module of a networking apparatus, the Fibre Channel communications comprising communications directed to a Fibre Channel fabric service and a communication addressed to the Fibre Channel address;
emulating the Fibre Channel fabric service to the HBA module, the emulating comprising translating the Fibre Channel communications directed to the Fibre Channel fabric service to communications directed to an Ethernet service;
encapsulating the communication addressed to the Fibre Channel address into one or more Ethernet frames;
obtaining an Ethernet address of a device from the one or more Ethernet addresses in the table, based on the Fibre Channel address;
addressing the one or more Ethernet frames to the Ethernet address; and
sending the communications directed to the Ethernet Service and the one or more Ethernet frames over an Ethernet network.

2. The method of claim 1, further comprising:
receiving Ethernet communications from the Ethernet network, the received Ethernet communications including communications received from an Ethernet service;
translating the received Ethernet communications into incoming Fibre Channel communications, the translating of the received Ethernet communications including translating the communications received from the Ethernet service to communications associated with a Fibre Channel fabric service; and sending the incoming Fibre Channel communications to the HBA module.

3. The method of claim 2, wherein at least one of the Fibre Channel communications that are directed to a Fibre Channel fabric service is addressed to a Fibre Channel name server or another Fibre Channel Fabric service, and the emulating includes translating the at least one of the Fibre Channel communications into one or more communications formatted for and addressed to the iSNS server within the Ethernet network.

4. The method of claim 3, wherein the Fibre Channel communications include a communication for registering with a Fibre Channel name server and the emulating includes generating a communication for registering with the iSNS server.

5. A method comprising:
providing a networking apparatus having a Host Bus Adapter (HBA) module and a Fibre Channel over Ethernet (FCoE) module;
communicating with an Ethernet network by the FCoE module; and
virtualizing a Fibre Channel network by the FCoE module for the HBA module, the virtual Fibre Channel network being based on the Ethernet network, the virtualizing of a Fibre Channel network comprising:
requesting one or more Ethernet addresses from an Internet Storage Name Service (iSNS) server,
receiving a seed value from the iSNS server,
generating one or more Fibre Channel addresses using the seed value provided by the iSNS server,
saving the one or more Fibre Channel addresses and the one or more Ethernet addresses in a table,
sending a Fibre Channel address, from the one or more Fibre Channel addresses in the table, to the HBA module,
obtaining an Ethernet address of a device from the one or more Ethernet addresses in the table, based on the Fibre Channel address,
mapping the Fibre Channel address to an Ethernet address,
encapsulating the communication addressed to the Fibre Channel address into one or more Ethernet frames,
addressing the one or more Ethernet frames to the Ethernet address,
tunneling Fibre Channel frames over Ethernet frames, and
using one or more Ethernet services in emulating one or more Fibre Channel fabric services to the HBA module.

6. The method of claim 5, wherein the one or more existing Ethernet services include the iSNS server, and the method comprises virtualizing a Fibre Channel name server for the HBA module by the FCoE module by utilizing the iSNS server.

7. A non-transitory computer readable medium comprising computer executable instructions being configured, when executed by one or more processors, to cause a networking apparatus to perform a method comprising:
requesting a Fibre Channel address and an Ethernet address of a device from an Internet Storage Name Service (iSNS) server;
receiving a seed value and the Ethernet address from the iSNS server;
saving the Fibre Channel address and the Ethernet address in a table;
generating a Fibre Channel address using the seed value provided by the iSNS server;
sending the Fibre Channel address to a Host Bus Adapter (HBA) module;
generating Fibre Channel communications by the HBA module of a networking apparatus, the Fibre Channel communications comprising communications directed to a Fibre Channel fabric service and a communication addressed to the Fibre Channel address;
emulating the Fibre Channel fabric service to the HBA module, the emulating comprising translating the Fibre Channel communications directed to the Fibre Channel fabric service to communications directed to an Ethernet service;
encapsulating the communication addressed to the Fibre Channel address into one or more Ethernet frames;
obtaining an Ethernet address of the first device from the table, based on the Fibre Channel address;
addressing the one or more Ethernet frames to the Ethernet address; and
sending the communications directed to the Ethernet Service and the one or more Ethernet frames over an Ethernet network.

8. The non-transitory computer readable medium of claim 7, the method further comprising:
receiving Ethernet communications from the Ethernet network, the received Ethernet communications including communications received from an Ethernet service;
translating the received Ethernet communications into incoming Fibre Channel communications, the translating of the received Ethernet communications including translating the communications received from the Ethernet service to communications associated with a Fibre Channel fabric service; and
sending the incoming Fibre Channel communications to the HBA module.

9. The non-transitory computer readable medium of claim 8 wherein at least one of the Fibre Channel communications is addressed to a Fibre Channel name server or another Fibre Channel Fabric service, and the emulating includes translating the at least one Fibre Channel communications into one or more communications formatted for and addressed to the iSNS server within the Ethernet network.

10. The non-transitory computer readable medium of claim 9 wherein the Fibre Channel communications include a communication for registering with a Fibre Channel name server and the emulating includes generating a communication for registering with the iSNS server.

11. A networking apparatus comprising:
a Host Bus Adapter (HBA) module configured to communicate with a Fibre Channel network; and
a Fibre Channel over Ethernet (FCoE) module configured to communicate with an Ethernet network and configured to provide a virtual Fibre Channel network to the HBA module, the virtual Fibre Channel network being based on the Ethernet network which includes one or more Ethernet servers, the providing the virtual Fibre Channel network to the HBA module comprising:
requesting one or more Ethernet addresses from from an Internet Storage Name Service (iSNS) server;
receiving a seed value from the iSNS server,
generating one or more Fibre Channel addresses using the seed value provided by the iSNS servers,
saving the one or more Fibre Channel addresses and the one or more Ethernet addresses in a table, sending a Fibre Channel address, from the one or more Fibre Channel addresses in the table, to the HBA module, obtaining an Ethernet address of a device from the one or more Ethernet addresses in the table, based on the Fibre Channel address, mapping the Fibre Channel address to an Ethernet address, encapsulating the communication addressed to the Fibre Channel address into one or more Ethernet frames, addressing the one or more Ethernet frames to the Ethernet address, tunneling Fibre Channel frames over Ethernet frames, and using one or more Ethernet services in emulating one or more Fibre Channel fabric services to the HBA module.

12. The networking apparatus of claim 11, wherein the HBA module is further configured to communicate with a Fibre Channel name server or another Fibre Channel Fabric service and the FCoE module is further configured to provide a virtual Fibre Channel name server and other Fibre Channel Fabric services to the HBA module by utilizing the iSNS server within the Ethernet network.

13. The networking apparatus of claim 12, wherein the FCoE module comprises a service mapper for translating Fibre Channel name server and other Fibre Channel Fabric service based communications into iSNS based communications and iSNS based communications into Fibre Channel name server and other Fibre Channel Fabric service based communications.

14. The networking apparatus of claim 13, wherein the service mapper is configured to construct a Fibre Channel address for the networking apparatus and register the Fibre Channel address with the iSNS server.

15. The networking apparatus of claim 12, wherein the Ethernet network is a Converged Enhanced Ethernet (CEE) network and the FCoE module comprises an IP Stack/CEE interface for formatting communications for the CEE network.

16. The networking apparatus of claim 12, wherein the FCoE module further comprises an FCoE data transfer element, which is utilized to process communications between the HBA module and devices in the Ethernet network other than the iSNS server.

17. The networking apparatus of claim 16, wherein the FCoE data transfer element includes a table of pairs of addresses, each pair of addresses including an Ethernet address of a device connected to the Ethernet network and a Fibre Channel address (N_Port_ID) associated with the device.

18. The networking apparatus of claim 17, wherein the FCoE data transfer element is configured to populate the table by obtaining pairs of addresses from communications received from the iSNS server.

19. An Fibre Channel over Ethernet Adapter (FCoEA) comprising the networking apparatus of claim 11.

20. A computer including the networking apparatus of claim 11.

21. A networked storage device including the networking apparatus of claim 11.

22. A storage area network including one or more computing devices, wherein at least one of the one or more computing devices includes the networking apparatus of claim 11.

23. A method of allowing Fibre Channel based communications through an Ethernet network comprising:

issuing one or more Fibre Channel fabric commands by a Host Bus Adapter (HBA) module of a networking apparatus, the HBA module being configured to communicate over a Fibre Channel network;

emulating a Fibre Channel fabric service to the HBA module, the emulating including translating the one or more Fibre Channel fabric commands to one or more Internet Storage Name Service (iSNS) server commands formatted for transmission over an Ethernet network comprising an iSNS server;

sending the one or more translated commands to the iSNS server;

requesting one or more Ethernet addresses from the iSNS server;

receiving a seed value and the Ethernet address from the iSNS server;

generating one or more Fibre Channel addresses using the seed value provided by the iSNS server;

saving the one or more Fibre Channel addresses and the one or more Ethernet addresses in a table;

issuing a Fibre Channel communication addressed to a Fibre Channel address from the one or more Fibre Channel addresses in the table;

obtaining an Ethernet address of a device from the one or more Ethernet addresses in the table, based on the Fibre Channel address;

encapsulating the Fibre Channel communication addressed to the Fibre Channel address into one or more Ethernet frames addressed to the Ethernet address; and sending the one or more Ethernet frames.

24. The method of claim 23, further comprising:

receiving from the iSNS server a response to the one or more iSNS commands, the response identifying another device connected to the Ethernet network;

translating the response to a Fibre Channel fabric formatted response; and sending the Fibre Channel fabric formatted response to the HBA module.

25. The method of claim 24, wherein:

the response received from the iSNS server includes an Ethernet address associated with the another device and a Fibre Channel address associated with the another device; and the translated response includes the Fibre Channel address associated with the another device, the method further comprising:

saving the Ethernet and Fibre Channel addresses of the another device.

26. The method of claim 25, wherein the issued Fibre Channel communication is addressed to the Fibre Channel address of the another device, and the method further comprises;

accessing the saved Ethernet address of the another device, wherein the one or more Ethernet frames are addressed to the saved Ethernet address of the another device.

27. The method of claim 4, wherein the generated communication for registering with the iSNS server includes commands for saving both a Fibre Channel and an Ethernet address associated with the networking apparatus at the iSNS server.

28. The method of claim 10, wherein the generated communication for registering with the iSNS server includes commands for saving both a Fibre Channel and an Ethernet address associated with the networking apparatus at the iSNS server.

29. The method of claim 1, wherein the emulating further includes:

communicating Ethernet specific information between the networking apparatus and the Ethernet service in response to or as part of one or more of the translated communications.

30. The method of claim 29, wherein the communicating includes:
receiving, by the networking apparatus, the Ethernet specific information from the Ethernet service in response to one or more of the translated communications, and
wherein the one or more Ethernet frames are addressed based on the Ethernet specific information.

31. The method of claim 29, wherein the communicating includes:
sending the translated communications to the Ethernet service, one of the translated communications including a command to the Ethernet service to save an Ethernet address associated with the networking apparatus, the method further comprising:
receiving, by the networking apparatus, an Ethernet frame from another networking apparatus that received the saved Ethernet address from the Ethernet service, the received Ethernet frame addressed to the saved Ethernet address.

32. The method of claim 5, wherein the emulating includes:
translating communications directed to the one or more Fibre Channel fabric services to communications directed to the one or more Ethernet services; and
communicating the Ethernet addresses between the networking apparatus and the one or more Ethernet services in response to or as part of one or more of the translated communications.

33. The method of claim 32, wherein the communicating includes:
receiving, by the networking apparatus, said Ethernet addresses from the one or more Ethernet services in response to one or more of the translated communications, and
wherein said Ethernet frames are addressed based on said received Ethernet addresses.

34. The method of claim 32, wherein the communicating includes:
sending the translated communications to the one or more Ethernet services, one of the translated communications including a command to the one or more Ethernet services to save an Ethernet address associated with the networking apparatus, the virtualizing further comprising:
receiving, by the networking apparatus, an Ethernet frame from another networking apparatus that received the saved Ethernet address from the one or more Ethernet services, the received Ethernet frame addressed to the saved Ethernet address.

35. The non-transitory computer readable medium of claim 7, wherein the emulating further includes:
communicating Ethernet specific information between the networking apparatus and the Ethernet service in response to or as part of one or more of the translated communications.

36. The non-transitory computer readable medium of claim 35, wherein the communicating includes:
receiving, by the networking apparatus, the Ethernet specific information from the Ethernet service in response to one or more of the translated communications, and
wherein the one or more Ethernet frames are addressed based on the Ethernet specific information.

37. The non-transitory computer readable medium of claim 35, wherein the communicating includes:
sending the translated communications to the Ethernet service, one of the translated communications including a command to the Ethernet service to save an Ethernet address associated with the networking apparatus, the method further comprising:
receiving, by the networking apparatus, an Ethernet frame from another networking apparatus that received the saved Ethernet address from the Ethernet service, the received Ethernet frame addressed to the saved Ethernet address.

38. The networking apparatus of claim 11, wherein the emulating includes:
translating communications directed to the one or more Fibre Channel fabric services to communications directed to the one or more Ethernet Servers; and
communicating the Ethernet addresses between the networking apparatus and the one or more Ethernet Servers in response to or as part of one or more of the translated communications.

39. The networking apparatus of claim 38, wherein the communicating includes:
receiving, by the networking apparatus, said Ethernet addresses from the one or more Ethernet Servers in response to one or more of the translated communications, and
wherein said Ethernet frames are addressed based on said received Ethernet addresses.

40. The networking apparatus of claim 38, wherein the communicating includes:
sending the translated communications to the one or more Ethernet Servers, one of the translated communications including a command to the one or more Ethernet Servers to save an Ethernet address associated with the networking apparatus, the providing further comprising:
receiving, by the networking apparatus, an Ethernet frame from another networking apparatus that received the saved Ethernet address from the one or more Ethernet Servers, the received Ethernet frame addressed to the saved Ethernet address.

41. The method of claim 23, wherein the emulating further includes:
communicating Ethernet specific information between the networking apparatus and the iSNS server in response to or as part of the one or more translated commands.

42. The method of claim 41, wherein the communicating includes:
receiving, by the networking apparatus, the Ethernet specific information from the iSNS server in response to the one or more translated commands, and
wherein the one or more Ethernet frames are addressed based on the Ethernet specific information.

43. The method of claim 41, wherein the communicating includes:
sending the one or more translated commands to the iSNS server, the one or more translated commands including a command to the iSNS server to save an Ethernet address associated with the networking apparatus, the method further comprising:
receiving, by the networking apparatus, an Ethernet frame from another networking apparatus that received the saved Ethernet address from the iSNS server, the received Ethernet frame addressed to the saved Ethernet address.

* * * * *